(12) United States Patent
Lambert et al.

(10) Patent No.: US 12,512,742 B2
(45) Date of Patent: Dec. 30, 2025

(54) FORCE-PRODUCING ELECTROMAGNETIC ACTUATOR

(71) Applicant: DP WORLD LOGISTICS US HOLDINGS, INC., Auburn Hills, MI (US)

(72) Inventors: Tim Lambert, Los Angeles, CA (US); Noel Godinez, Los Angeles, CA (US); Irfan-ur-rab Usman, Los Angeles, CA (US); Erik Johnson, Los Angeles, CA (US); George Tirone, Los Angeles, CA (US)

(73) Assignee: DP WORLD LOGISTICS US HOLDINGS, INC., Auburn Hills, MI (US)

( * ) Notice: Subject to any disclaimer, the term of this patent is extended or adjusted under 35 U.S.C. 154(b) by 674 days.

(21) Appl. No.: 17/774,038

(22) PCT Filed: Nov. 5, 2020

(86) PCT No.: PCT/US2020/059028
§ 371 (c)(1),
(2) Date: May 3, 2022

(87) PCT Pub. No.: WO2021/092118
PCT Pub. Date: May 14, 2021

(65) Prior Publication Data
US 2022/0384077 A1     Dec. 1, 2022

Related U.S. Application Data

(60) Provisional application No. 62/945,978, filed on Dec. 10, 2019, provisional application No. 62/932,113, (Continued)

(51) Int. Cl.
*H01F 7/11*      (2006.01)
*H01F 7/06*      (2006.01)
(Continued)

(52) U.S. Cl.
CPC ............. *H02K 41/03* (2013.01); *H01F 7/064* (2013.01); *H01F 7/081* (2013.01); *H01F 27/28* (2013.01);
(Continued)

(58) Field of Classification Search
CPC .......... H02K 41/03; H02K 1/14; H02K 1/143; H02K 1/18; H02K 1/20; H02K 3/04;
(Continued)

(56) References Cited

U.S. PATENT DOCUMENTS

| | | |
|---|---|---|
| 893,711 A | 7/1908 | Cushman |
| 4,544,856 A | 10/1985 | King |

(Continued)

FOREIGN PATENT DOCUMENTS

| | | |
|---|---|---|
| CA | 2567523 A1 | 12/2005 |
| DE | 19732564 A1 | 2/1999 |

(Continued)

OTHER PUBLICATIONS

"International Search Report" mailed Mar. 1, 2021, issued in corresponding PCT Application No. PCT/US2020/059010, Filed Nov. 5, 2020.

(Continued)

*Primary Examiner* — Shawki S Ismail
*Assistant Examiner* — Lisa N Homza
(74) *Attorney, Agent, or Firm* — Seyfarth Shaw LLP

(57) ABSTRACT

An electromagnetic actuator for generating force is provided. The electromagnetic actuator includes a ferromagnetic body extending along a longitudinal axis, the ferromagnetic body comprising: a back-iron portion; and a pair of pole portions, extending from the back-iron portion, the back-iron portion connecting the pair of pole portions. The electromagnetic actuator further includes one or more magnetic-flux changing components at the pole portions, a (Continued)

respective magnetic-flux changing component located at a respective pole face, the respective magnetic-flux changing component configured to change magnetic flux density at a respective track-facing surface relative to the respective pole face. The electromagnetic actuator further includes electrical windings around the pole portions.

17 Claims, 16 Drawing Sheets

Related U.S. Application Data filed on Nov. 7, 2019, provisional application No. 62/932,077, filed on Nov. 7, 2019, provisional application No. 62/931,935, filed on Nov. 7, 2019, provisional application No. 62/932,013, filed on Nov. 7, 2019, provisional application No. 62/931,987, filed on Nov. 7, 2019.

(51) Int. Cl.
| | | |
|---|---|---|
| H01F 7/08 | (2006.01) | |
| H01F 27/28 | (2006.01) | |
| H02K 1/14 | (2006.01) | |
| H02K 1/18 | (2006.01) | |
| H02K 1/20 | (2006.01) | |
| H02K 3/04 | (2006.01) | |
| H02K 5/22 | (2006.01) | |
| H02K 9/22 | (2006.01) | |
| H02K 11/21 | (2016.01) | |
| H02K 11/25 | (2016.01) | |
| H02K 41/025 | (2006.01) | |
| H02K 41/03 | (2006.01) | |
| H02K 49/04 | (2006.01) | |
| H05K 7/20 | (2006.01) | |
| H02K 7/10 | (2006.01) | |

(52) U.S. Cl.
CPC ............... *H02K 1/14* (2013.01); *H02K 1/143* (2013.01); *H02K 1/18* (2013.01); *H02K 1/20* (2013.01); *H02K 3/04* (2013.01); *H02K 5/225* (2013.01); *H02K 9/227* (2021.01); *H02K 11/21* (2016.01); *H02K 11/25* (2016.01); *H02K 41/025* (2013.01); *H02K 41/031* (2013.01); *H02K 49/046* (2013.01); *H05K 7/20254* (2013.01); *H01F 2007/086* (2013.01); *H01F 7/11* (2013.01); *H02K 7/10* (2013.01); *H02K 2201/15* (2013.01); *H02K 2213/12* (2013.01)

(58) Field of Classification Search
CPC ........ H02K 5/225; H02K 9/227; H02K 11/21; H02K 11/25; H02K 41/025; H02K 41/031; H02K 49/046; H02K 7/10; H02K 2201/15; H02K 2213/12; H02K 3/18; H02K 3/40; H02K 3/52; H02K 11/40; H01F 7/064; H01F 7/081; H01F 27/28; H01F 7/11; H01F 2007/086; H05K 7/20254; Y02T 10/64; Y02T 10/72; B60L 13/03
USPC ........................................................ 335/279
See application file for complete search history.

(56) References Cited

U.S. PATENT DOCUMENTS

| | | | |
|---|---|---|---|
| 4,689,529 A | 8/1987 | Higuichi | |
| 4,788,477 A | 11/1988 | Teramachi et al. | |
| 4,928,028 A * | 5/1990 | Leibovich | H01F 7/1646 310/23 |
| 5,289,088 A | 2/1994 | Andoh | |
| 5,719,451 A * | 2/1998 | Cook | H02K 33/16 318/135 |
| 5,868,077 A | 2/1999 | Kuznetsov | |
| 6,522,035 B1 | 2/2003 | Smit | |
| 6,741,010 B2 | 5/2004 | Wilkin | |
| 7,872,551 B2 * | 1/2011 | Nakamura | H01H 51/2272 335/202 |
| 7,982,567 B2 * | 7/2011 | Cartier Millon | H01H 51/2209 335/229 |
| 8,169,284 B2 * | 5/2012 | Talon | F01L 9/20 335/297 |
| 8,289,117 B2 * | 10/2012 | Dal Re | H01F 3/14 335/229 |
| 8,325,004 B2 * | 12/2012 | Nagano | H01F 30/06 336/212 |
| 8,427,271 B2 * | 4/2013 | Nakatsu | H01F 37/00 336/212 |
| 8,558,651 B2 * | 10/2013 | Suzuki | H01F 27/266 336/212 |
| 8,598,973 B2 * | 12/2013 | Kawaguchi | H01F 27/022 336/212 |
| 8,729,992 B2 * | 5/2014 | Schiepp | H01F 7/1646 335/229 |
| 9,478,342 B2 * | 10/2016 | Reuber | H01H 71/10 |
| 9,507,276 B2 * | 11/2016 | Van Lievenoogen | H01L 21/68 |
| 11,043,869 B2 * | 6/2021 | Hsu | H02K 3/345 |
| 11,069,500 B2 * | 7/2021 | Chao | H01H 50/648 |
| 11,670,442 B2 * | 6/2023 | Horie | H01F 27/292 336/192 |
| 11,936,268 B2 * | 3/2024 | Kang | H02K 3/522 |
| 11,972,899 B2 * | 4/2024 | Seethaler | H01F 7/16 |
| 12,112,888 B2 * | 10/2024 | Weis | H01F 7/0242 |
| 2002/0053835 A1 | 5/2002 | Joong et al. | |
| 2002/0081528 A1 | 6/2002 | Miyajima et al. | |
| 2005/0029874 A1 | 2/2005 | Dadd | |
| 2006/0131967 A1 | 6/2006 | Lin et al. | |
| 2008/0143202 A1 | 6/2008 | Whitener et al. | |
| 2008/0218005 A1 | 9/2008 | Tang et al. | |
| 2012/0249991 A1 | 10/2012 | Hol et al. | |
| 2013/0015725 A1 | 1/2013 | Trammell | |
| 2013/0113320 A1 | 5/2013 | Calley et al. | |
| 2015/0091393 A1 | 4/2015 | Hayner et al. | |
| 2015/0171706 A1 | 6/2015 | Dadd | |
| 2017/0236630 A1 * | 8/2017 | Kank | H01F 7/1646 335/230 |
| 2017/0346373 A1 | 11/2017 | Pabut et al. | |
| 2018/0131258 A1 | 5/2018 | Dawidowicz | |
| 2018/0166953 A1 | 6/2018 | Han | |

FOREIGN PATENT DOCUMENTS

| | | | |
|---|---|---|---|
| DE | 102006027819 A1 | 12/2007 | |
| EP | 0093547 A1 | 11/1983 | |
| EP | 1213819 A2 | 6/2002 | |
| EP | 1511164 A2 | 3/2005 | |
| EP | 1544980 A1 | 6/2005 | |
| EP | 2876783 A1 | 5/2015 | |
| EP | 3107195 A1 | 12/2016 | |
| EP | 3258131 A1 | 12/2017 | |
| FR | 1165541 A1 | 10/1958 | |
| FR | 2526570 A1 | 11/1983 | |
| JP | S586055 A | 1/1983 | |
| JP | S5886859 A | 5/1983 | |
| JP | S6098864 A | 6/1985 | |
| JP | 2012044811 A | 3/2012 | |
| WO | 03105317 A1 | 12/2003 | |
| WO | 2008142001 A2 | 11/2008 | |
| WO | WO-2015156494 A1 * | 10/2015 | H01F 7/04 |

OTHER PUBLICATIONS

"International Search Report" mailed Feb. 15, 2021, issued in corresponding PCT Application No. PCT/US2020/059012, Filed Nov. 5, 2020.

(56) References Cited

OTHER PUBLICATIONS

Molnar, Sabinus, "International Search Report" mailed Feb. 23, 2021, issued in corresponding PCT Application No. PCT/US2020/059017, Filed Nov. 5, 2020.
Molnar, Sabinus, "International Search Report" mailed Feb. 24, 2021, issued in corresponding PCT Application No. PCT/US2020/059023, Filed Nov. 5, 2020.
Contreras, Sampayo, J., "International Search Report" mailed Apr. 15, 2021, issued in corresponding PCT Application No. PCT/US2020/059028, Filed Nov. 5, 2020.
Kovacsovics, Martin, "International Search Report", mailed Mar. 1, 2021, issued in corresponding PCT Application No. PCT/US2020/059036, Filed Nov. 5, 2020.

* cited by examiner

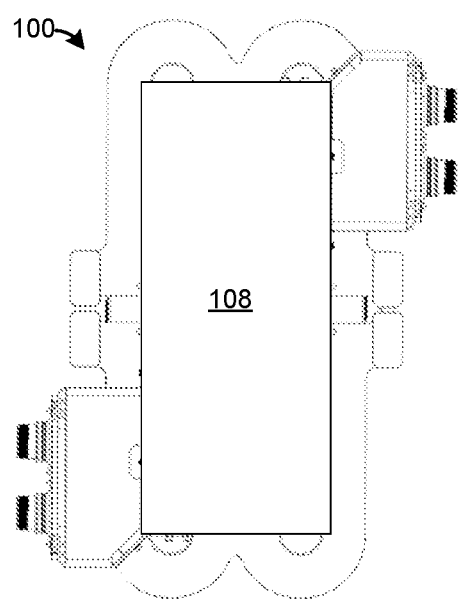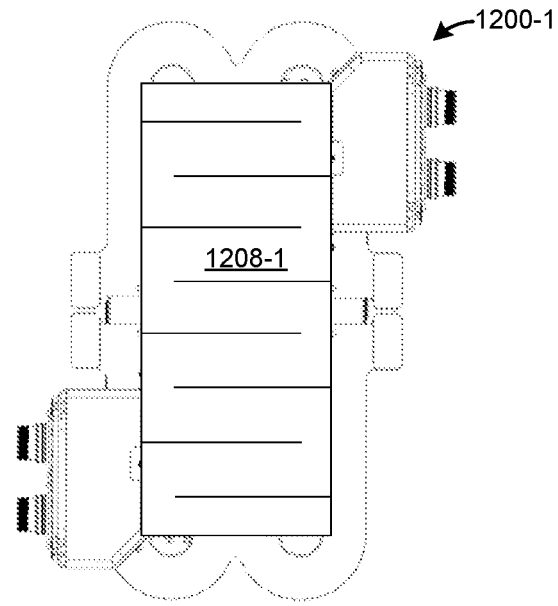
FIG. 12A  FIG. 12B
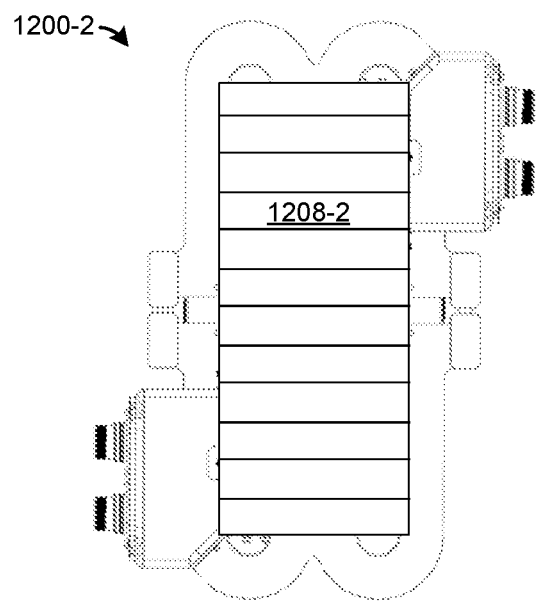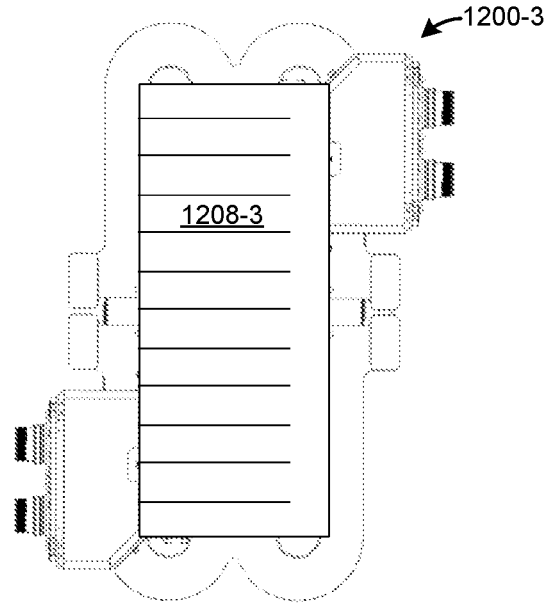
FIG. 12C  FIG. 12D

FORCE-PRODUCING ELECTROMAGNETIC ACTUATOR

CROSS-REFERENCE TO RELATED APPLICATIONS

This application claims priority from US Provisional Patent Applications having Ser. Nos. 62/932,077, 62/932,113, 62/932,013, 62/931,935, 62/931,987, all of which were filed on Nov. 7, 2019, and the entire contents of which are incorporated herein by reference; this application further claims priority from US Provisional Patent Application having Ser. No. 62/945,978, filed on Dec. 10, 2019, the entire contents of which is incorporated herein by reference.

BACKGROUND

The constraints of a transportation system that seeks to promote high speed, high efficiency, and high power density, impose challenges that are not present in the state of the art. In particular, such a transportation system may include an electromagnetic actuator for generating force. Track losses caused by such an electromagnetic actuator may be problematic.

BRIEF DESCRIPTIONS OF THE DRAWINGS

For a better understanding of the various examples described herein and to show more clearly how they may be carried into effect, reference will now be made, by way of example only, to the accompanying drawings in which:

FIG. 12A depicts a bottom view of the electromagnetic actuator of FIG. 1, according to non-limiting examples.

FIG. 12B, FIG. 12C and FIG. 12D depict respective bottom views of electromagnetic actuators with back-iron portions adapted to reduce and/or interrupt eddy currents, according to non-limiting examples.

Figure 13A:
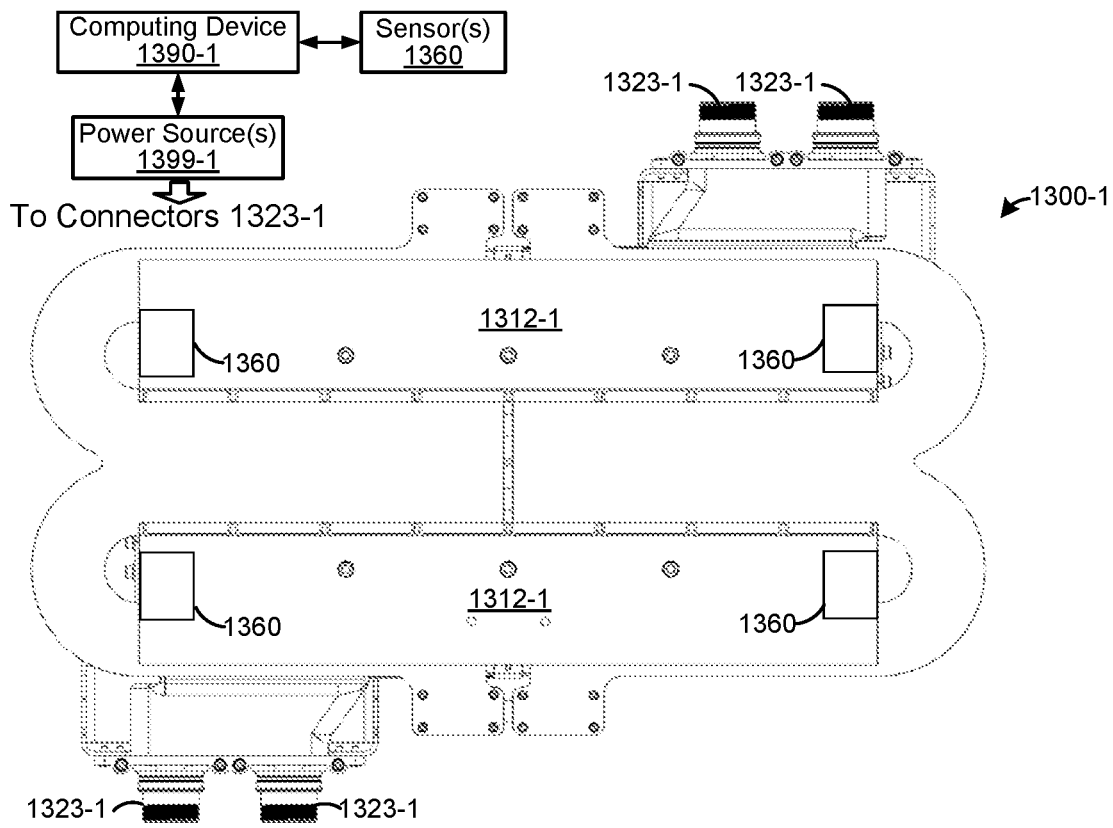
Figure 13B:
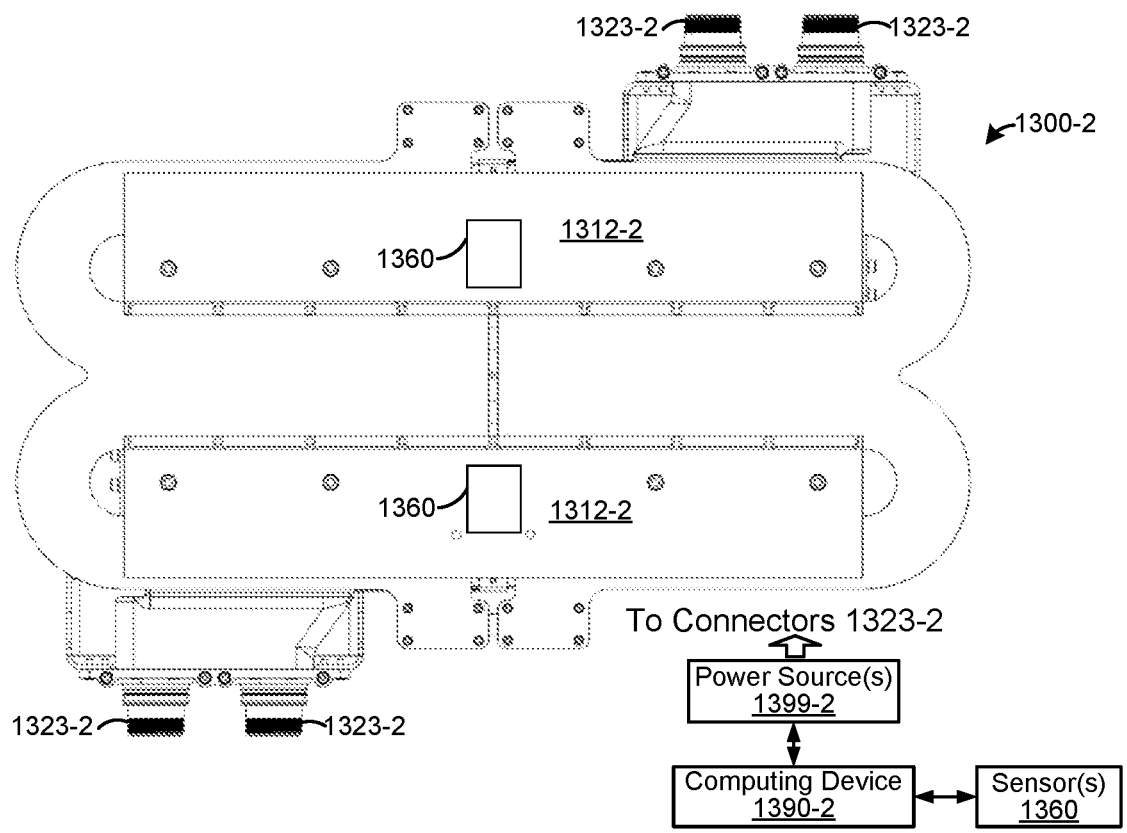

FIG. 13A, and FIG. 13B depict respective top views of electromagnetic actuators that include magnetic flux sensors, according to non-limiting examples.

Figure 14A:
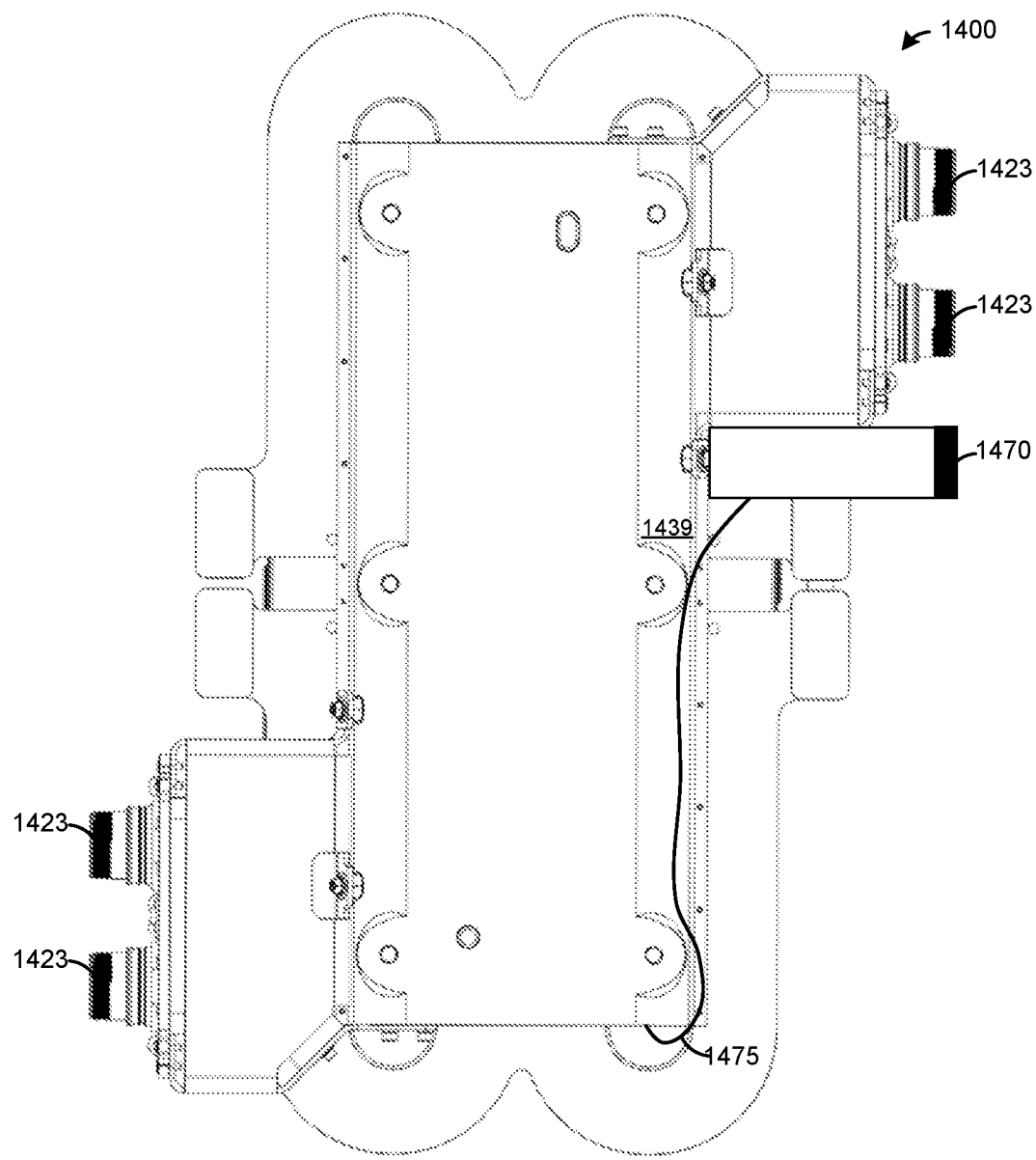
Figure 14B:
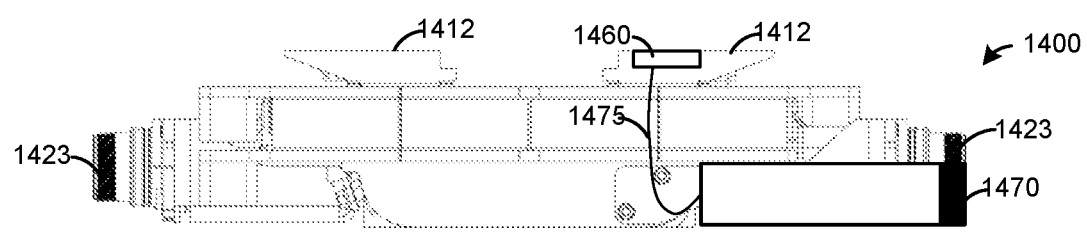

FIG. 14A, and FIG. 14B respectively depict a bottom view and a side view of an electromagnetic actuator that includes one or more magnetic flux sensors, a data connector therefor, and harnessing therebetween, according to non-limiting examples.

Figure 15A:
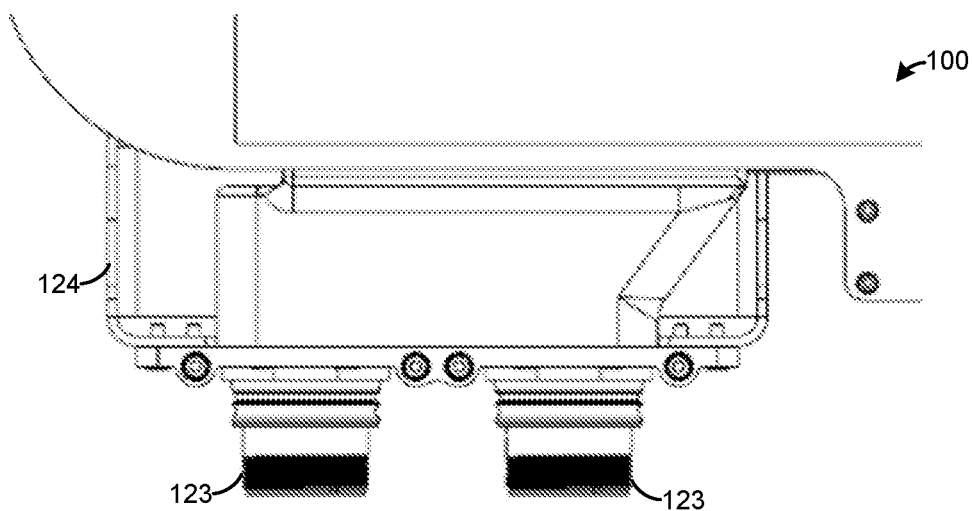
Figure 15B:
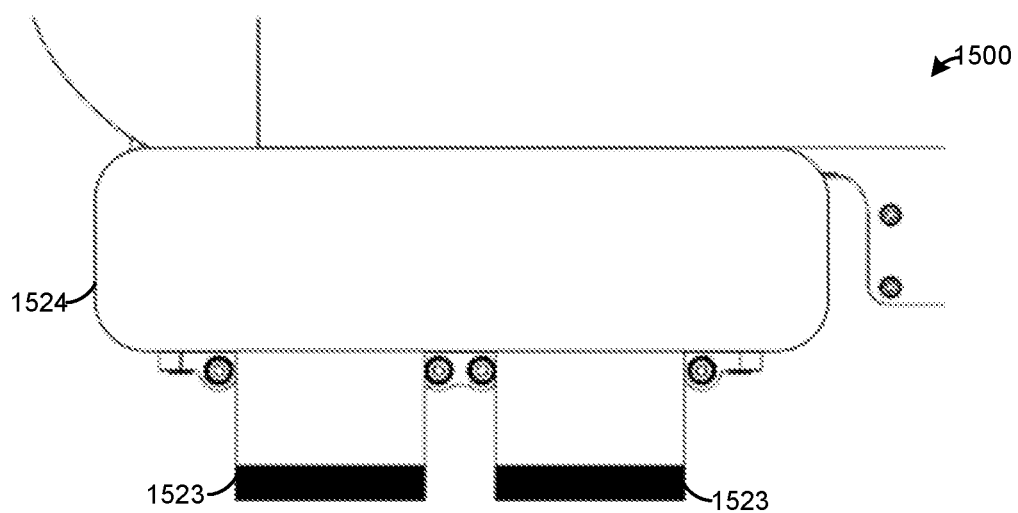

FIG. 15A, and FIG. 15B respectively depict different types of electrical connectors to coils of electrical windings of electromagnetic actuators provided herein, according to non-limiting examples.

Figure 1:
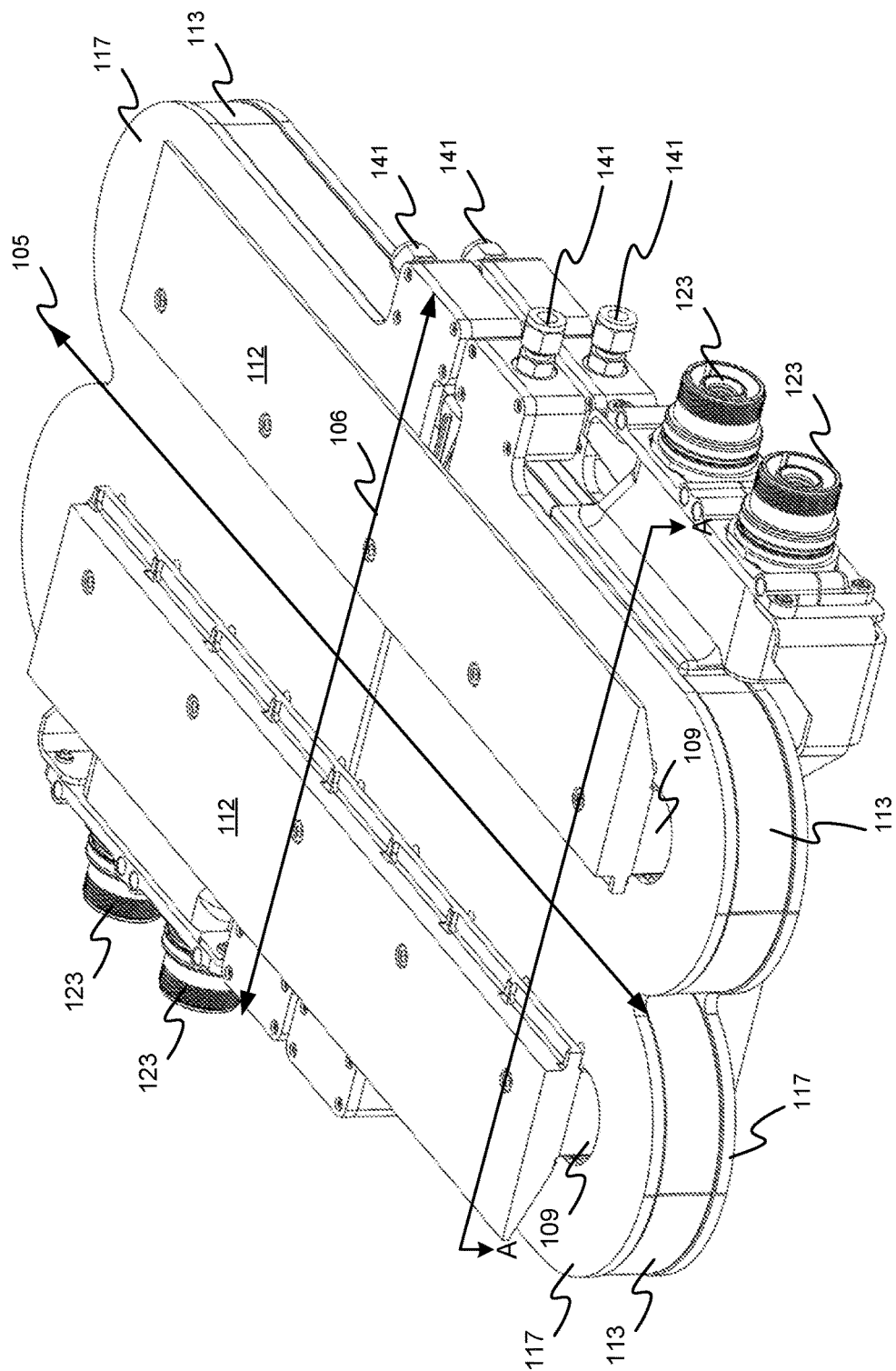
FIG. 1 depicts a perspective view of an electromagnetic actuator for generating force, according to non-limiting examples.
Figure 16A:
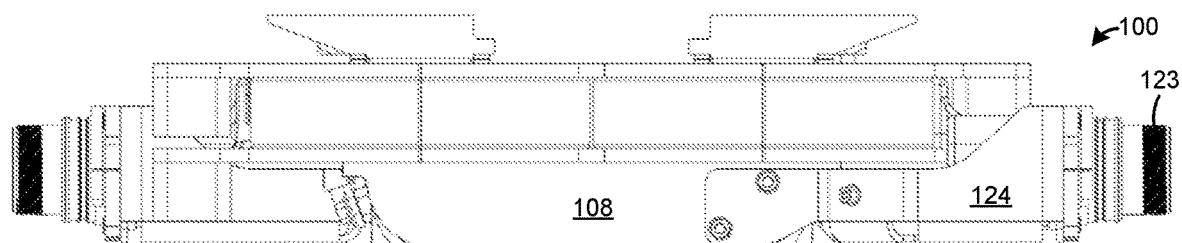
Figure 16B:
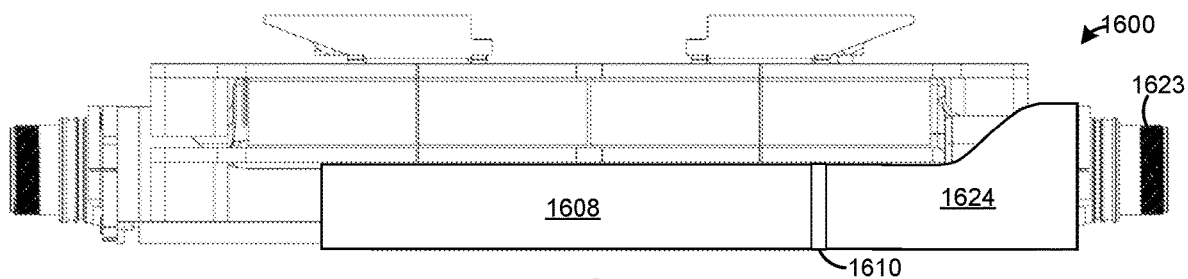

FIG. 16A, and FIG. 16B respectively depict side views of the electromagnetic actuator of FIG. 1, and an alternative electromagnetic actuator, to show different types of trays and/or brackets used to support electrical connectors provided herein, according to non-limiting examples.

DETAILED DESCRIPTION

The constraints of a transportation system that seeks to promote high speed, high efficiency, and high power density, impose challenges that are not present in the state of the art. In particular, such a transportation system may include an electromagnetic actuator for generating force. Track losses caused by such an electromagnetic actuator may be problematic.

For example, an electromagnetic actuator may include pole portions, joined by a back-iron portion, which interact with a ferromagnetic track to produce force. One or more of the electromagnetic actuators may be attached to a pod and/or vehicle and/or payload which moves relative to the track, for example using a propulsion system and/or a levitation system. As an electromagnetic actuator moves relative to the track, losses at the track due to eddy currents induced by a changing magnetic flux at the leading and trailing edges of the electromagnetic actuator, may impact power consumption of the vehicle propulsion system, for example as electromagnetic "drag" due to the eddy currents act to slow the vehicle, which leads to an increase in power to the vehicle propulsion system.

Furthermore, as eddy currents are time-dependent, this loss can also impact the magnetic flux distribution in the airgap (also referred to as the active airgap) between the track and the pole faces of the pole portions; the faster the vehicle moves, the larger the impact on the magnetic flux distribution. In particular, the impact on the magnetic flux distribution is usually to reduce a rate of change thereof. Thus, a leading edge of the magnetic flux may be suppressed, and a trailing edge of the magnetic flux may be increased and/or reinforced. The net effect is a suppression of attractive force between the electromagnetic actuator and the track. Hence, power may be increased at windings that cause magnetic flux in the electromagnetic actuator, to compensate for reductions in force due to the eddy currents induced in the track.

Hence, provided herein is a force-producing electromagnetic actuator that includes magnetic-flux changing components (which may also be referred to as flux-density suppression components) located at pole faces of pole portions of the electromagnetic actuator; the magnetic-flux changing components reduce amplitude of the magnetic flux density in the active airgap by spreading magnetic-flux over a wider area than the pole faces alone. In some examples, the magnetic-flux changing components may retain additional active components used with a magnetic circuit in the electromagnetic actuator; for example, the magnetic-flux changing components may have a larger area than the pole faces, and be flanged and/or tapered outwardly along a lateral axis, and be configured to retain electrical windings of the electromagnetic actuator around the pole portions.

In some examples, the electromagnetic actuator comprises a "U" shaped ferromagnetic body which includes a back-iron portion and a pair of pole portions extending from the back-iron portion, the back-iron portion connecting the pair of pole portions.

The electromagnetic actuator generally includes electrical windings around the pole portions. In some examples, the electrical windings are generally planar, and at least partially disposed in a slot between the pole portions, and are retained by the magnetic-flux changing components.

However, in other examples, the electrical windings may include steps and/or kinks and/or be formed along multiple planes, such that a portion of a winding in the slot is at a different height than another portion of the winding outside of the slot, relative, for example, to the pole faces. In some examples, magnetic-flux changing components may extend out over electrical windings outside the slot to retain the electrical windings between the magnetic-flux changing components and another portion of the electromagnetic actuator, for example a frame and/or cold plate of the electromagnetic actuator (e.g. with the cold plate attached to the frame).

In some examples, a winding may be disposed and/or sandwiched and/or clamped between two cold plates, such that the magnetic-flux changing components engage with a first cold plate in at least one region, and the first cold plate thereby assists at retaining a winding; put another way, the first cold plate may be between a portion of a magnetic-flux changing component and a winding. A second cold plate may be disposed and/or located on a side of the electrical windings opposite the first cold plate, and the second cold plate may be attached to a frame of the electromagnetic actuator, as may the first cold plate.

In some examples, the electromagnetic actuator comprises at least one cold plate which is segmented, such that the cold plate does not encircle the periphery of any pole portion, to reduce eddy currents in the cold plate.

Hence, an aspect of the present specification provides an electromagnetic actuator for generating force, the electromagnetic actuator comprising: a ferromagnetic body extending along a longitudinal axis, the ferromagnetic body comprising: a back-iron portion; and a pair of pole portions, extending from the back-iron portion, the back-iron portion connecting the pair of pole portions; one or more magnetic-flux changing components at the pole portions, a respective magnetic-flux changing component located at a respective pole face, the respective magnetic-flux changing component configured to change magnetic flux density at a respective track-facing surface relative to the respective pole face; and, electrical windings around the pole portions.

The electromagnetic actuator may further comprise a lateral axis, perpendicular to the longitudinal axis, the lateral axis extending between opposing outer sides of the pair of pole portions, wherein each of the magnetic-flux changing components comprises a respective bar located at the respective pole face, the respective bar extending along the longitudinal axis at the respective pole face, the respective bar decreasing in width along the lateral axis, towards a respective outer side.

Hence, the magnetic-flux changing components may have a flange shape to spread magnetic flux and which may also retain electrical windings used to control the magnetic flux.

However, in some examples the magnetic-flux changing components may be removed and/or certain functionality thereof may be integrated into other parts of an electromagnetic actuator provided herein, such that a further aspect of the present specification provides an electromagnetic actuator for generating force comprising: a ferromagnetic body extending along a longitudinal axis, the ferromagnetic body comprising: a back-iron portion; and a pair of pole portions, extending from the back-iron portion, the back-iron portion connecting the pair of pole portions; electrical windings around the pole portions; and one or more retaining devices and/or cooling devices configured to retain (and/or removably retain) and/or cool the electrical winding.

Attention is next directed to FIG. 1, FIG. 2, FIG. 3, FIG. 4, FIG. 5 and FIG. 6 which respectively depict: a perspective view of an electromagnetic actuator 100 for generating force; a cross-sectional view of the electromagnetic actuator 100 through the line A-A of FIG. 1; an end view of the electromagnetic actuator 100; a top view of the electromagnetic actuator 100; a bottom view of the electromagnetic actuator 100; and a side view of the electromagnetic actuator 100.

The electromagnetic actuator 100 may comprise an electromagnetic actuator for guidance (e.g. a guidance actuator), and one or more of the electromagnetic actuators 100 and may be attached to a pod (e.g. a vehicle and/or payload), and the like, of a transportation system, the one or more electromagnetic actuators 100 to interact with a track of the transportation system to adjust a position of the pod relative to the track, as well as the positions of other actuators and/or magnetic machines relative to respective tracks, for example to adjust and/or maintain distances between such actuators and/or magnetic machines and their respective tracks. For example, a track (e.g. of ferromagnetic material) for the electromagnetic actuator 100 may be mounted adjacent the electromagnetic actuator 100 and, in operation, the electromagnetic actuator 100 may produce a force which pulls on the electromagnetic actuator 100, as well as the pod to which the electromagnetic actuator 100 is attached. When a plurality of the electromagnetic actuators 100 are distributed on the pod, adjacent one or more respective tracks, selective actuation of the electromagnetic actuators 100 may adjust and/or maintain distances between actuators and/or magnetic machines of the pod and their respective tracks. One or more of the electromagnetic actuators 100 may be attached to a pod and/or vehicle and/or payload used in a high speed transport system which may be deployed on land, underground, overland, overwater, underwater, and the like; a pod and/or vehicle and/or payload of the highspeed transport system may comprise a vehicle, and the like, for transporting cargo and/or passengers, and the like, and/or any other suitable payloads.

The track may be mounted in a tube, and/or at a wall, and the like, of the transportation system which may be partially evacuated. The pod may include further electromagnetic actuators for propulsion, levitation and/or braking along respective tracks, in the tube. However, the electromagnetic actuator 100 may be used for any suitable functionality.

The electromagnetic actuator 100 has a longitudinal axis 105 and lateral axis 106, about perpendicular to the longitudinal axis 105. In general, the electromagnetic actuator 100 may be mounted to a pod and/or vehicle and/or payload such that the electromagnetic actuator 100 moves in a direction of the longitudinal axis 105 (e.g. "forwards" or "backward" along the longitudinal axis 105), for example when propelled by a propulsion system.

Figure 2:
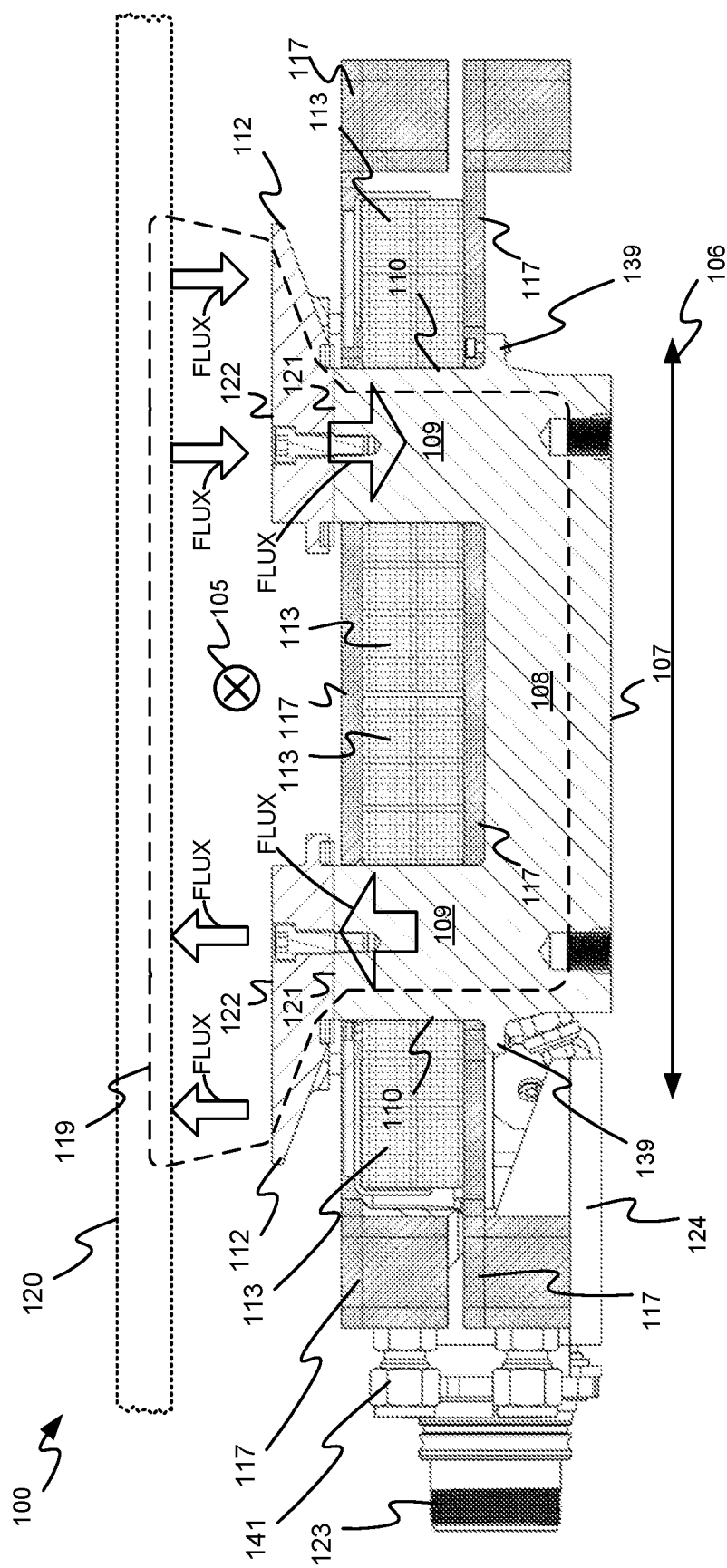
FIG. 2 depicts a cross-sectional view of the electromagnetic actuator of FIG. 1 through the line A-A, according to non-limiting examples.
Figure 3:
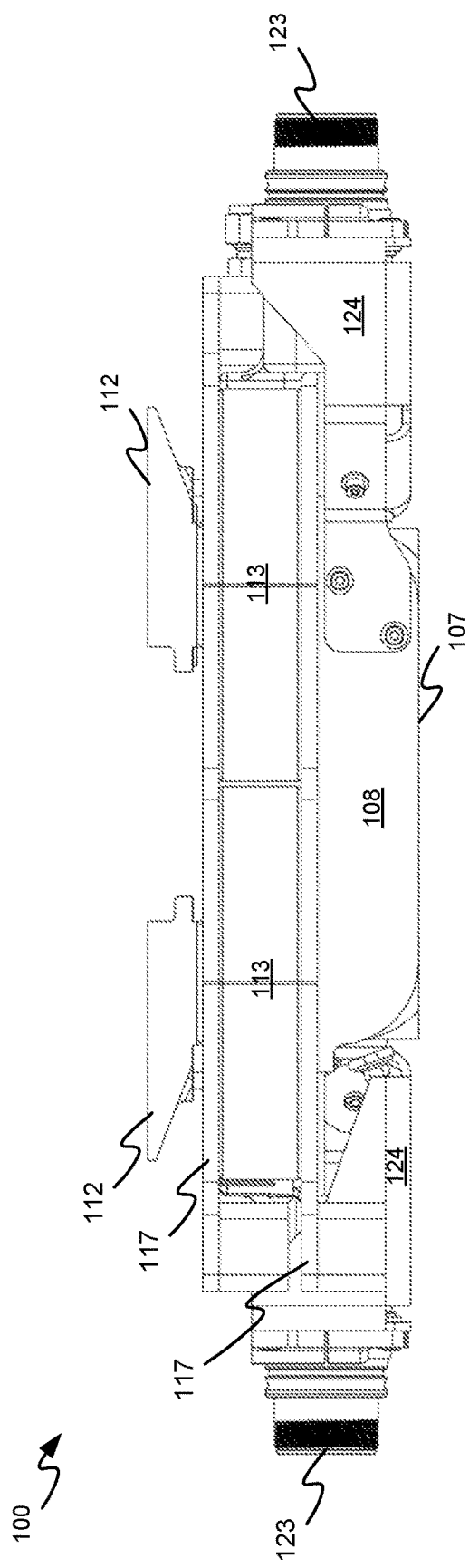
FIG. 3 depicts an end view of the electromagnetic actuator of FIG. 1, according to non-limiting examples.

The electromagnetic actuator 100 comprises a ferromagnetic body 107 extending along the longitudinal axis 105 (e.g. about perpendicular to the lateral axis 106), the ferromagnetic body 107 comprising: a back-iron portion 108; and a pair of pole portions 109, extending from the back-iron portion 108, the back-iron portion 108 connecting the pair of pole portions 109. As best seen in FIG. 2, the ferromagnetic body 107 may generally be "U" shaped in cross-section, and have a length along the longitudinal axis 105. As also best seen in FIG. 2, the lateral axis 106 may extend between and/or through opposing external sides and/or outer sides 110 the pair of pole portions 109. However, the ferromagnetic body 107 may have any suitable shape.

The ferromagnetic body 107 may generally be solid and/or integrated; put another way the ferromagnetic body 107 may generally be formed as a single piece of ferromagnetic material. However, in other examples, the ferromagnetic body 107 may be segmented and/or laminated.

The electromagnetic actuator 100 further comprises one or more magnetic-flux changing components 112 at the pole portions 109, as described in more detail below. As depicted, the one or more magnetic-flux changing components 112 may be in a one-to-one relationship with the pole portions 109, however electromagnetic actuator 100 may include any suitable number of the magnetic-flux changing components 112, in any suitable configuration.

Furthermore, a magnetic-flux changing component 112 may alternatively be referred to as a pole tip and/or a magnetic-flux changing pole tip, as the magnetic-flux changing components 112 extend and/or magnetically modify a "tip" and/or pole face of a pole portion 109.

The electromagnetic actuator 100 further comprises electrical windings 113 around the pole portions 109. In some examples, the electrical windings 113 around the respective pole portions 109 may be independently controllable, as described in further detail below.

The electromagnetic actuator 100 may further comprise at least one cold plate 117 configured to cool the electrical windings 113 to reduce heat in the electromagnetic actuator 100. For example, heat in the electromagnetic actuator 100 may lead to reduced magnetic properties of the ferromagnetic body 107 (e.g. increased reluctance, and the like), and the at least one cold plate 117 may mitigate such issues. As depicted, the electromagnetic actuator 100 comprises four cold plates 117 (e.g. two "top" cold plates and two "bottom" cold plates, described in more detail below; terms such as "top" and "bottom" are understood to be with respect to pages of the figures, and are not meant to imply a specific orientation of the electromagnetic actuator 100).

As best seen in FIG. 2, there is one distinct magnetic-flux changing component 112 for each pole portion 109, and each of the magnetic-flux changing components 112 generally comprise a ferromagnetic material, which may be solid and/or laminated and/or provided as a plurality of ferromagnetic sections. However, in other examples, the magnetic-flux changing components 112 may be joined (e.g. via non-ferromagnetic material and/or a frame) and/or in other examples, the electromagnetic actuator 100 may comprise as few as one magnetic-flux changing component 112 (e.g. at one or both of the pole portions 109; when one magnetic-flux changing component 112 is at both the pole portions 109, such a magnetic-flux changing component 112 may be similar to the depicted magnetic-flux changing components 112 but joined together via non-ferromagnetic material and/or a non-ferromagnetic frame which is selected so as to not interfere with a magnetic circuit formed by the electromagnetic actuator 100 and a track as described below). Such a non-ferromagnetic material and/or a non-ferromagnetic frame, and the like, may be used to retain the ferromagnetic portions of the magnetic-flux changing component 112 and/or ferromagnetic portions of the magnetic-flux changing component 112. Furthermore, when one distinct magnetic-flux changing component 112 for each pole portion 109, and such magnetic-flux changing components 112 are provided as a plurality of ferromagnetic sections, a non-ferromagnetic material and/or a non-ferromagnetic frame may be used to retain such ferromagnetic sections. Furthermore, in any example that includes a non-ferromagnetic frame, such a non-ferromagnetic frame may be used to retain the electrical windings 113. Regardless, as will be described in more detail below, the magnetic-flux changing components 112 may be configured to retain, and/or removably retain, the electrical windings 113, for example in combination with the cold plates 117.

In particular, a respective magnetic-flux changing component 112 is located at a respective pole face 121 (e.g. a track-facing surface of a pole portion 109), and a respective magnetic-flux changing component 112 is generally configured to reduce magnetic flux density at a respective pole face 121. As depicted in FIG. 2 a magnetic-flux changing component 112 may be removably attached to a respective pole face 121 using any suitable fasteners (e.g. as depicted screws, and the like, which may also comprise a ferromagnetic material). Put another way, the one or more magnetic-flux changing components 112 may be removable from the pole faces 121. Put yet another way, the one or more magnetic-flux changing components 112 may be removably attached to one or more pole faces 121 of the pole portions 109.

The ferromagnetic body 107 generally extends along the longitudinal axis 105, and further provides a flux path 119 through and/or around the ferromagnetic body 107, as well as through a track 120, schematically depicted in FIG. 2, to generate a force on the electromagnetic actuator 100 relative to the track 120 for example to actuate a pod and/or vehicle and/or payload at which the electromagnetic actuator 100 is mounted, as described above. While the track 120 is depicted as planar, the track 120 may have any suitable shape.

A direction of magnetic flux flow is represented by arrows (e.g. labelled "FLUX") in FIG. 2, with changes in magnetic flux density along the flux path 119 represented by width of the arrows; such changes in magnetic flux density along the flux path 119 will be described hereafter.

Furthermore while the path 119 as depicted in FIG. 2 as a line, the path 119 is generally understood to be three-dimensional and passes through areas of the pole faces 121 and areas of track-facing surfaces 122 of the magnetic-flux changing component 112.

In some examples, the track 120 may be located above and/or adjacent to pole faces 121 of the pole portions 109, and specifically above and/or adjacent to track-facing surfaces 122 of the magnetic-flux changing components 112. Magnetic flux may flow from a pole face 121 of a first pole portion 109 (e.g. along the path 119), and through a track-facing surface 122 of a first magnetic-flux changing component 112, which reduces density of the magnetic flux, relative to the magnetic flux at pole face 121, as described below.

The magnetic flux flows across a gap (e.g. an active gap) between a track-facing surface 122 of the first magnetic-flux changing component 112, through the track 120, and back through the gap to a track-facing surface 122 of a second magnetic-flux changing component 112 which increases magnetic-flux density at a pole face 121 of a second pole portion 109, as described below.

The magnetic flux flows through the second pole portion 109, around the ferromagnetic body 107, and back to the first pole portion 109. Hence, the flux path 119 generally represents a magnetic circuit formed by the electromagnetic actuator 100 and the track 120. The magnetic flux disposed along, and/or in, the magnetic flux path 119 generally results in attractive force between the track-facing surfaces 122 and the track 120. As an electromagnetic actuator for propulsion (e.g. attached to the pod to which the electromagnetic actuator 100 is attached), may cause the electromagnetic actuator 100 to move relative to the track 120 (e.g. in a direction about parallel to the longitudinal axis 105), at least the track-facing surfaces 122 are generally machined to a suitable degree of precision (e.g. flatness) such that at the track-facing surfaces 122 an about constant distance is maintained between the electromagnetic actuator 100 and the track 120.

In general, as respective areas of the track-facing surfaces 122 of the magnetic-flux change component 112 are larger than respective areas of the pole faces 121 of the pole portions 109, the magnetic-flux changing component 112 acts to reduce or increase magnetic flux, relative to the pole faces 121, depending on a direction of the magnetic flux. For example, magnetic flux density of magnetic flux flowing from a pole face 121 to a track facing surface 122 of a magnetic-flux change component 112 is decreased, and magnetic flux density of magnetic flux flowing from a track facing surface 122 of a magnetic-flux change component 112 to a pole face 121 is increased. Put another way, a magnetic volume of a magnetic-flux change component 112 increases between a pole-facing surface (e.g. as depicted in FIG. 2, adjacent a respective pole face 121; also see FIG. 7) and a track facing surface 122, and/or a magnetic volume of a magnetic-flux change component 112 decreases between a track facing surface 122 and a pole-facing surface. Such a change in volume and/or magnetic volume may result in a commensurate decrease (e.g. from a pole-facing surface 121 to a track facing surface 122) or increase (e.g. from a track facing surface 122 to a pole-facing surface 121) in magnetic flux density (e.g. and may be modelled and/or understood as a constant-flow (e.g. constant magnetic flux), no-leakage (e.g. no magnetic flux leakage), linear system).

Hence, in general, the magnetic-flux changing components 112 may be configured to spread magnetic-flux over a wider area than the pole faces 121 alone (e.g. as the magnetic flux flows from a pole face 121 to a track facing surface 122); in particular, a the track facing surface 122 of a magnetic-flux change component 112 may have a larger area than a respective pole face 121.

However, in other examples, the magnetic-flux changing components 112 may be configured to reduce magnetic-flux over a narrower area than the pole faces 121 alone (e.g. as the magnetic flux flows from a pole face 121 to a track facing surface 122); in such examples the track facing surface 122 of a magnetic-flux change component 112 may have a smaller area than a respective pole face 121.

Hence, while in the depicted examples, operation of the electromagnetic actuator 100 relative to track 120 may depend on the track facing surface 122 of a magnetic-flux change component 112 having a larger area than a respective pole face 121 (e.g. to spread magnetic flux over a wider area than a respective pole face 121, relative to the track 120), in other systems, with other types of tracks etc., the magnetic-flux changing components 112 may be shaped to concentrate magnetic flux into a smaller area than a respective pole face 121, relative to a track). In such examples, a magnetic-flux change component 112 may have a wider lateral cross-section (e.g. along the lateral axis 106) at a pole face 121 and a narrower lateral cross-section at a track facing surface 122 (e.g. such a magnetic-flux change component 112 may narrow between a pole face 121 and a track facing surface 122).

Indeed, as best seen in FIG. 2, track-facing surfaces 122 of the magnetic-flux changing component 112 generally have a larger area than respective pole face 121. Such an increase in area may be achieved in any suitable manner as described hereafter.

In general, the electromagnetic actuator 100 comprises the one or more magnetic-flux changing components 112 at the pole portions 109, a respective magnetic-flux changing component 112 located at a respective pole face 121, the respective magnetic-flux changing component 112 configured to change magnetic flux density at a respective track-facing surface 122 relative to the respective pole face 121.

In depicted examples, the one or more magnetic-flux changing components 112 may be one or more of tapered and flanged in a direction of the lateral axis 106, and the track-facing surfaces 122 of the magnetic-flux changing components 112 are one or more of flat and parallel to both the longitudinal axis 105 and the lateral axis 106.

Put another way, the electromagnetic actuator 100 comprises the lateral axis 106, perpendicular to the longitudinal axis 105, the lateral axis 106 extending between opposing outer sides 110 of the pair of pole portions 109, wherein each of the one or more magnetic-flux changing components 112 comprises a respective bar, and the like located at a respective pole face 121, the respective bar extending along the longitudinal axis 105 at the respective pole face 121, the respective bar decreasing in width along the lateral axis 106, towards a respective outer side 110. Further, respective outward facing surfaces (e.g. the track-facing surfaces 122) of the respective bars are about parallel with each other.

A direction of the magnetic flux along the path 119 is generally determined by direction of current in the electrical windings 113. In particular, the magnetic flux may be controlled by the electrical windings 113, for example via respective pairs of connectors 123 (best seen in FIG. 1 and FIG. 4); in particular, the pairs of connectors 123 are generally configured to electrically connect to (e.g. complementary connectors of) a power source (e.g. as located at the pod and/or vehicle and/or payload) for driving respective electrical windings 113.

As depicted, the electromagnetic actuator 100 may further comprise one or more trays 124 and/or brackets for removably receiving the electrical connectors 123. The trays 124 and/or brackets may support the electrical connectors 123 and may be attached thereto using any suitable fasteners (e.g. bolts, screw, and the like). In some examples, one or more of the trays 124 and/or brackets may be attached to, and/or integrated with, a frame of the electromagnetic actuator 100, and/or one or more of the trays 124 and/or brackets may be attached to, and/or integrated with, a cold plate 117 of the electromagnetic actuator 100, and/or one or more of the trays 124 and/or brackets may be attached to the ferromagnetic body 107 of the electromagnetic actuator 100. Indeed, in some examples, the ferromagnetic body 107 may generally act as a frame of the electromagnetic actuator 100 and may comprise any suitable ledges, attachment points, and the like, for attaching other components of the electromagnetic actuator 100 thereto.

As a different pairs of connectors 123 are provided for each of the electrical windings 113, the electrical windings 113 are independently controllable and/or powered; hence, when one electrical winding 113 fails, operation of the electromagnetic actuator 100 may continue by continuing to operate the other electrical winding 113.

Figure 5:
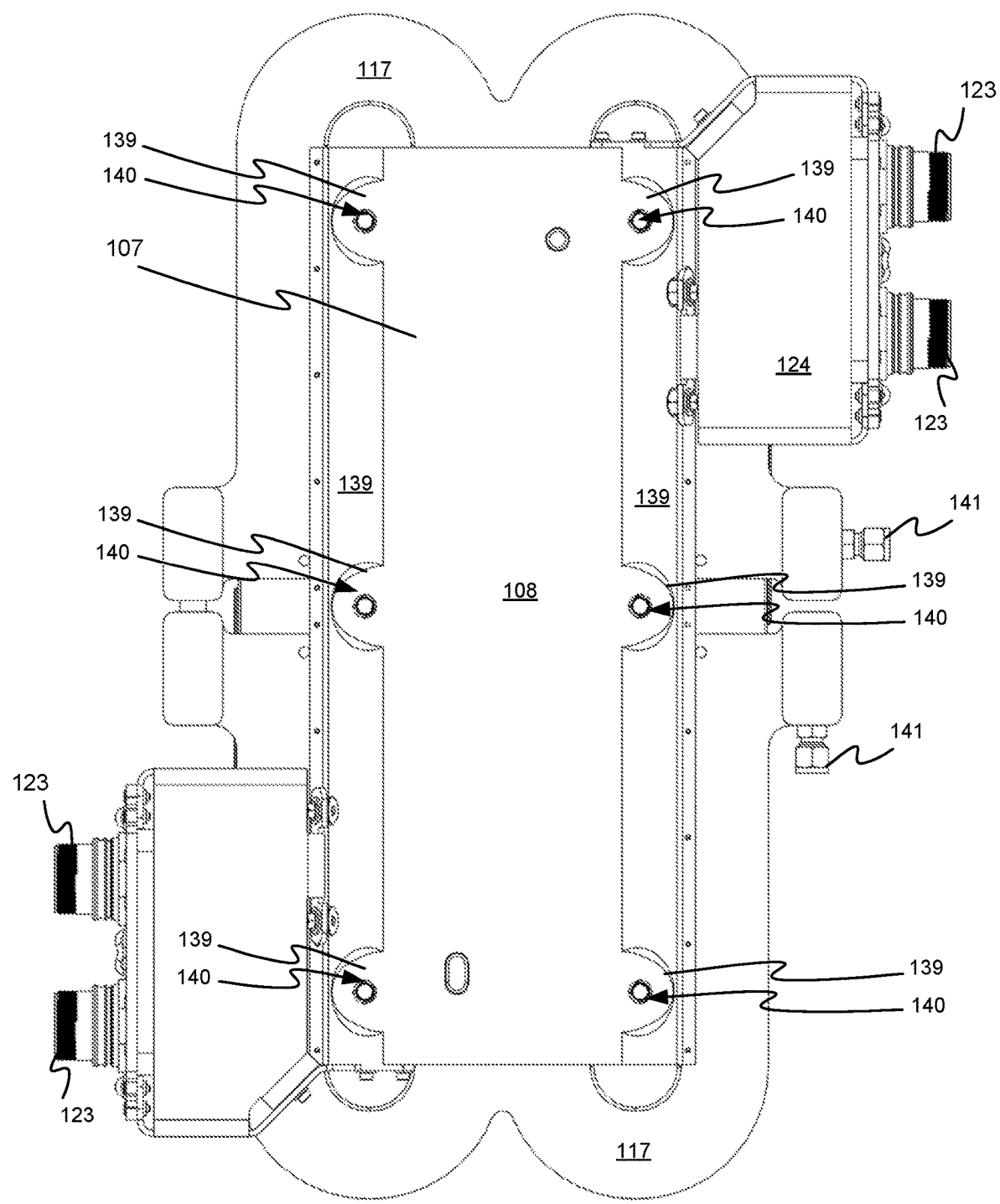
FIG. 5 depicts a bottom view of the electromagnetic actuator of FIG. 1, according to non-limiting examples.
Figure 6:
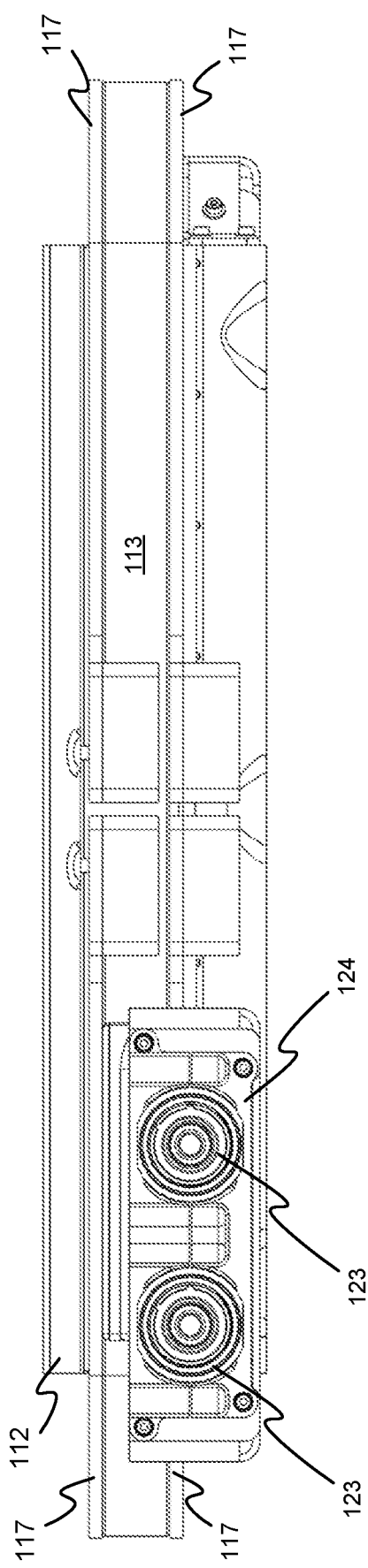
FIG. 6 depicts a side view of the electromagnetic actuator of FIG. 1, according to non-limiting examples.

The cold plates 117 are next described in more detail. For example, attention is again directed to FIG. 1 and FIG. 2 which depicts that the electrical windings 113 may be located, and/or are sandwiched, between two cold plates 117. For example, a "bottom" cold plate 117 may be supported by, and/or attached (e.g. using any suitable fasteners, as depicted bolts) to ledges 139 of the ferromagnetic body 107, and the electrical windings 113 may be located on this bottom cold plate 117. A top cold plate 117 may be located on the electrical windings 113. A bottom of the ledges 139 are also depicted in FIG. 5, which further shows attachment points 140 of the bottom cold plate 117 to the ledges 139; FIG. 5 further shows that the ledges 139 may be local to the attachment points 140.

Figure 4:
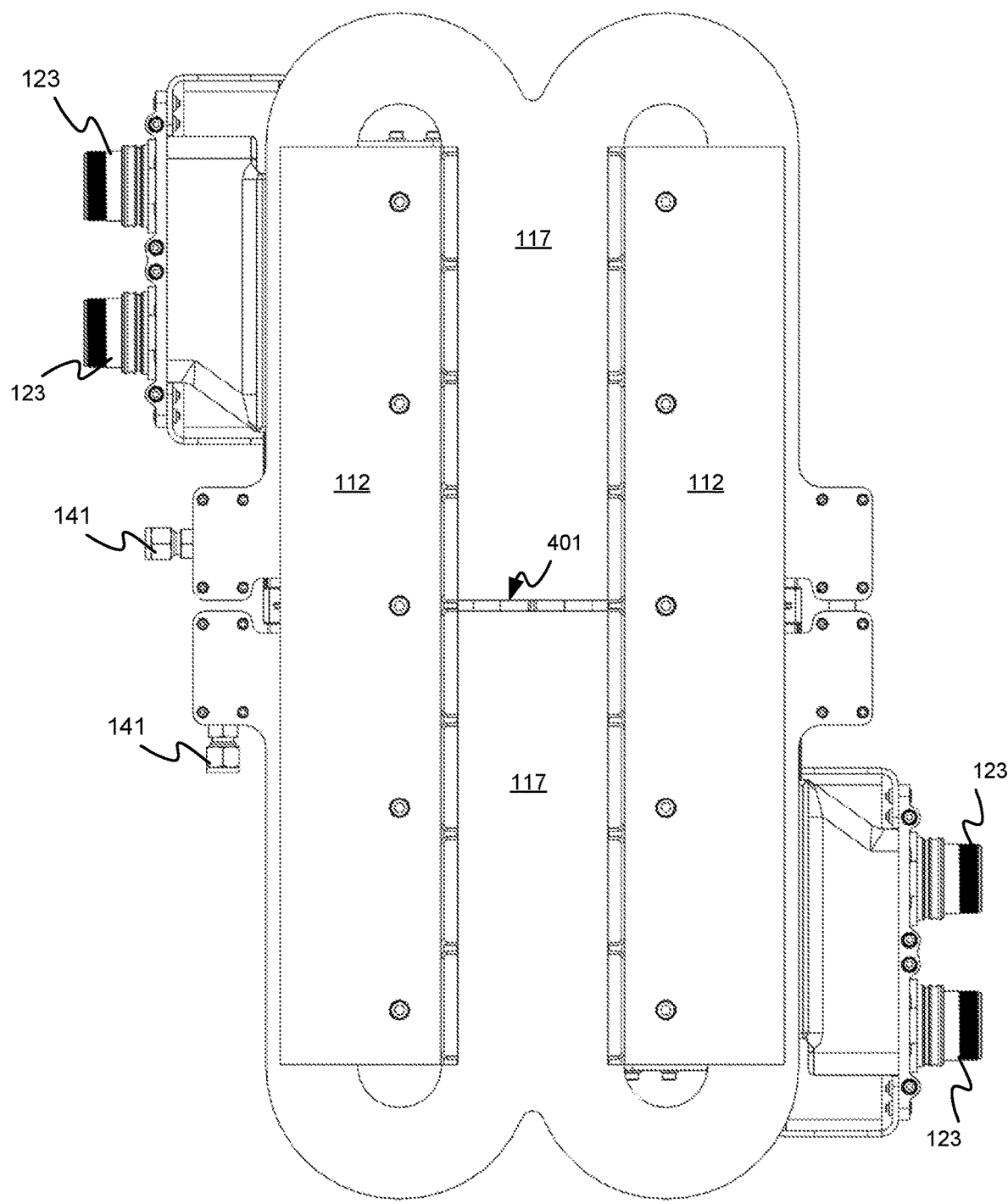
FIG. 4 depicts a top view of the electromagnetic actuator of FIG. 1, according to non-limiting examples.

With further reference to FIG. 4, "top" cold plates 117 include two cold plates 117 around the two pole portions 109, each of the cold plates 117 being a "W" shape and/or an "M" shape and/or an "E" shape. Similarly, with further reference to FIG. 5, "bottom" cold plates 117 also include two cold plates 117 around the two pole portions 109, each of the cold plates 117 being a "W" shape and/or an "M" shape and/or an "E" shape. Indeed, the top and bottom sets of cold plates 117 may be similar to each other, however modified for their respective positions relative to the electrical windings 113.

In particular, top and bottom cold plates 117 each comprise a respective gap 401 therebetween to interrupt eddy currents in the cold plates 117 around the pole portions 109. The gap 401 between the top cold plates 117 is best seen in FIG. 4; while a respective gap 401 is also between the bottom cold plates 117 of FIG. 5, the respective gap 401 is hidden by the back-iron portion 108. Hence, with reference to FIG. 4, as depicted, the gap 401 may be formed where the two cold plates 117 meet and/or are closest to each other and/or extend towards each other (e.g. the term "meet" is not meant to imply that the two cold plates 117 touch) and/or extend towards each other. Put another way, a plate 117 (e.g. a cold plate 117) comprises a gap 401 disposed along a direction substantially perpendicular to a flow of current in a coil of an electrical winding 113, such that the at least one plate 117 is not contiguous around the pole portion 109. Put yet another way, the at least one plate 117 comprises a gap 401, such that the at least one plate 117 is discontinuous around the pole portion 109. Put yet another way, the at least one plate 117 is interrupted by a gap 401 which is disposed between an external edge of the at least one plate 117 and the pole portion 109, to interrupt eddy currents in the at least one plate 117 around the pole portion 109.

The cold plates 117 may comprise one or more cooling channels (not depicted) and connectors 141 (e.g. cooling channel connectors) to connect the one or more cooling channels to a liquid coolant supply (e.g. as located at the pod). A liquid coolant pump, and the like (e.g. as located at the pod), may pump liquid coolant through the cooling channels via the connectors 141. A cold plate 117 may comprise a housing which houses respective connectors 141 (e.g. at least two connectors 141 per cold plate 117); such housings may extend out and perpendicular to cooling portions of a cold plate 117, for example to provide clearance for stacking the cold plates 117 on the electromagnetic actuator 100.

In some examples, however, one or more of the cold plates 117 may be replaced with a plate which may or may not provide cooling functionality. While, hereafter, references are made to a cold plate 117, the term "cold plate" may be replaced throughout with the term "plate" and/or "plate with cooling functionality". For example, a plate with, or without cooling functionality may also have electrical winding retaining functionality, for example as described below. In some examples, such a plate and/or the cold plate 117, may comprise ferromagnetic material to provide magnetic functionality to the plate (e.g. such a plate and/or the cold plate 117, may function as part of the ferromagnetic body 107).

The electrical windings 113 may be removable, and the respective magnetic-flux changing components 112 may be further configured to retain the electrical windings 113. Put another way, a respective magnetic-flux changing component 112 may be further configured to retain at least one of the electrical windings 113. For example, attention is next directed to FIG. 7 and FIG. 8 which respectively depict: a cross-section exploded view of a portion of the electromagnetic actuator of FIG. 1 (e.g. through the line A-A of FIG. 1, but only showing one pole portion 109); and the electromagnetic actuator 100 with one of the magnetic-flux changing components 112 removed.

Figure 7:
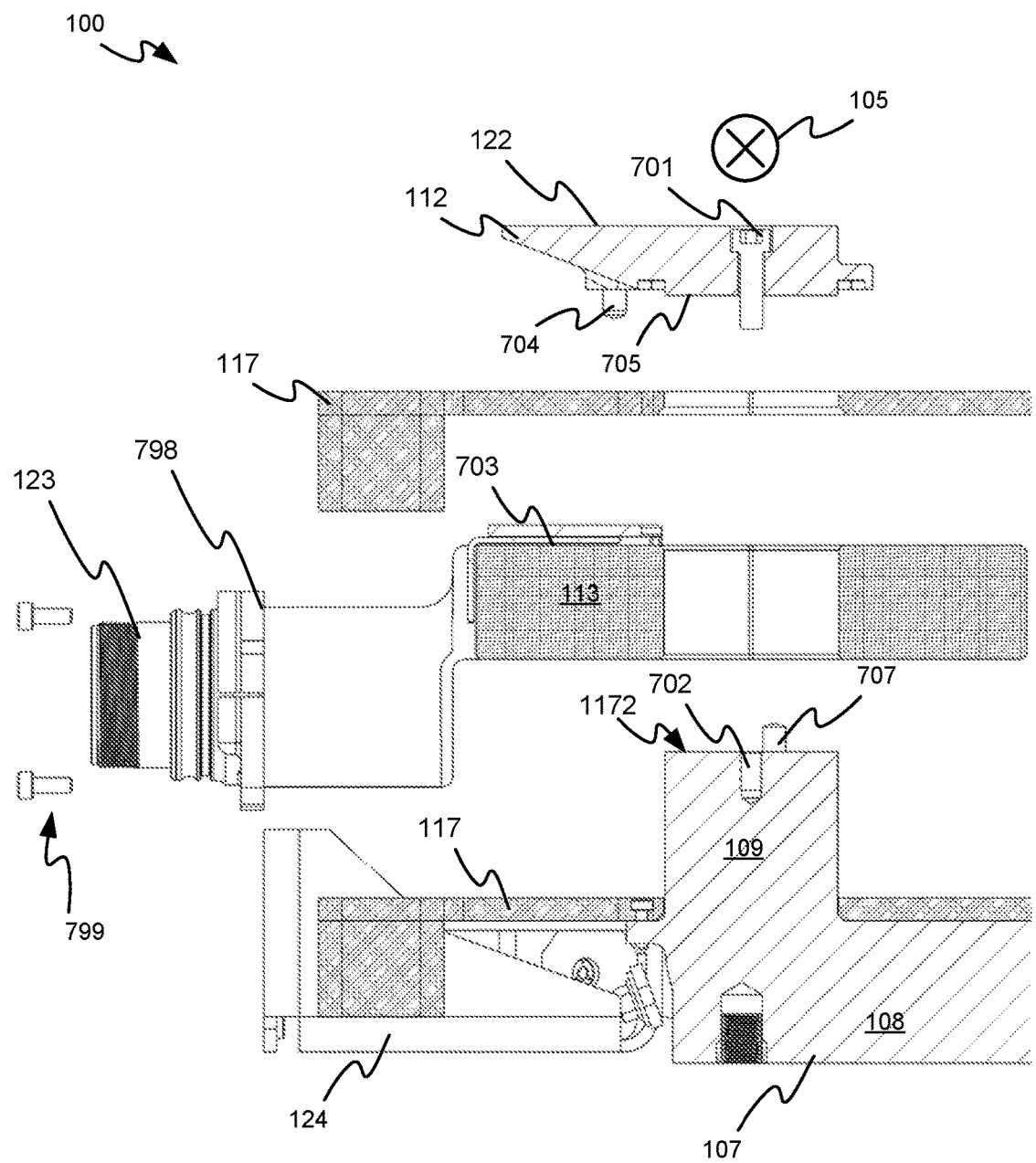
FIG. 7 depicts a cross-sectional exploded view of a portion of the electromagnetic actuator of FIG. 1, according to non-limiting examples.
Figure 8:
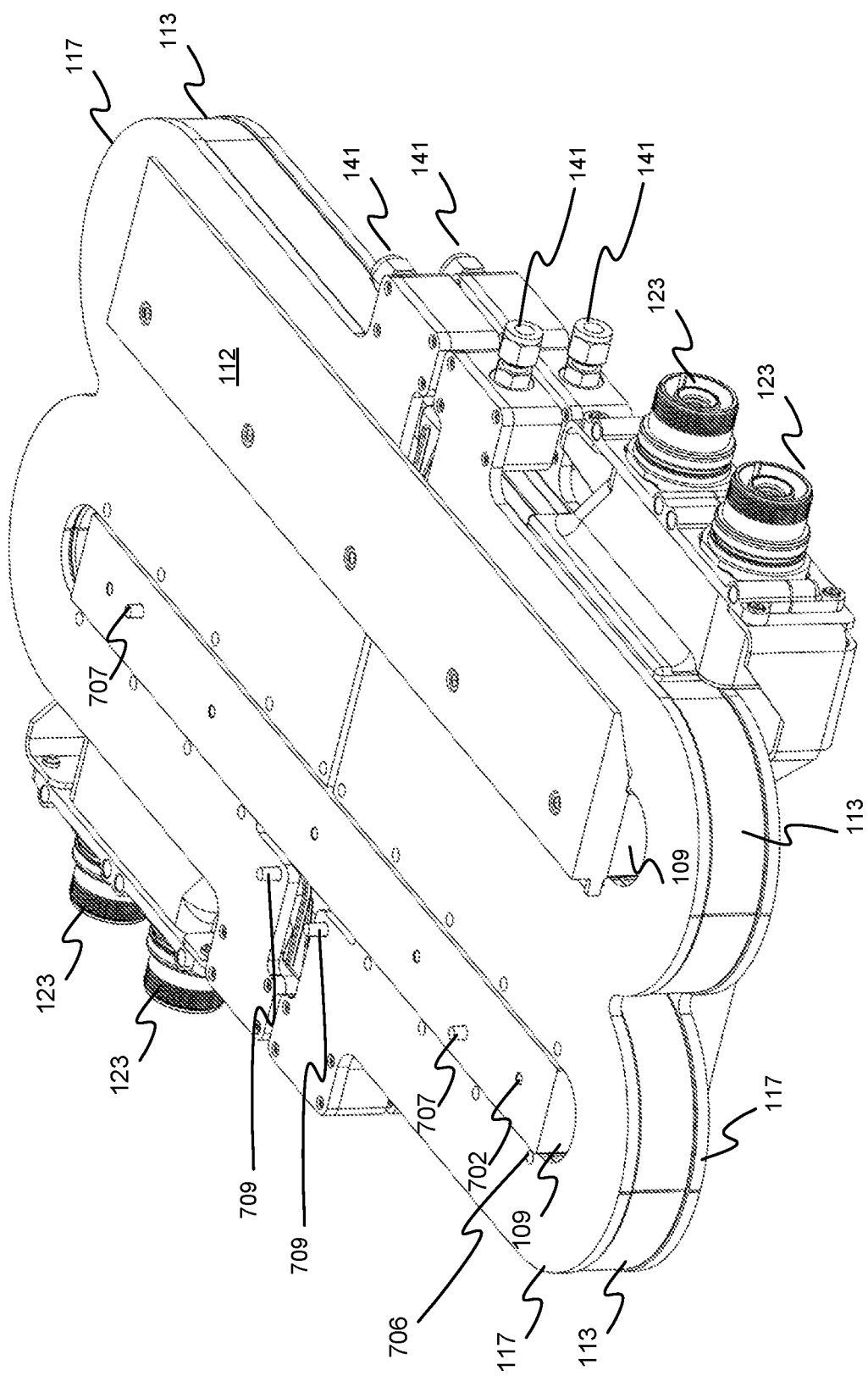
FIG. 8 depicts a perspective view of the electromagnetic actuator of FIG. 1 with a magnetic-flux changing component removed, according to non-limiting examples.

FIG. 7 depicts removal of an electrical winding 113 from the electromagnetic actuator 100, while FIG. 8 depicts the electrical windings 113 over and/or around respective pole portions 109. Put another way, in FIG. 8, the electrical windings 113 are in an operating position. However, as clearly seen in FIG. 7 and FIG. 8, the magnetic-flux changing components 112 may be removable to remove one or more of the electrical windings 113 (e.g. and at least the top cold plates 117, when present).

For example, with reference to FIG. 7, a magnetic-flux changing component 112 may be removably attached to a pole face 121 of a pole portion 109, for example via one or more fasteners 701 (e.g. at least a partially threaded fastener) through apertures of the magnetic-flux changing component 112 that mate with respective holes 702 (e.g. at least a partially threaded hole), and the like, in the pole face 121 of the pole portion 109.

The magnetic-flux changing component 112 (e.g. the magnetic-flux changing component 112) extends at least partially across an outward opposing surface 703 of the electrical windings 113; in particular, as described above, a cold plate 117 is between the magnetic-flux changing component 112 and the outward opposing surface 703 of the electrical windings 113. Hence, for example, the magnetic-flux changing component 112 may be of similar ferromagnetic material as the ferromagnetic body 107, and attached to the external surface 1172 of the pole portions 109 using the at least one fastener 701 (e.g. screws, bolts, and the like), and which may also be ferromagnetic, and which mechanically retain the electrical winding 113 on the pole portion 109.

As best seen in FIG. 7, one or more pins 704 may extend from a pole-facing surface 705 of the magnetic-flux changing component 112 may assist with retaining the magnetic-flux changing component 112 in position relative to the pole portion 109. For example, such pins 704 may mate with respective holes 706 in the cold plate 117 (one of which is indicated in FIG. 8). Similarly, one or more pins 707 may extend from a pole face 121 of a pole portion 109 which may mate with respective holes (not depicted) in the pole-facing surface 705 of the magnetic-flux changing component 112. Similarly, one or more pins 709 may extend from an outward facing side of a cold plate 117 which may mate with respective holes (not depicted) in the pole-facing surface 705 of the magnetic-flux changing component 112. Indeed, the pins 709 and respective holes may assist in retaining the top cold plate 117 at the electromagnetic actuator 100, which may further assist in retaining the electrical windings 113 at the electromagnetic actuator 100.

FIG. 7 further shows removal of the electrical winding 113. In particular, a magnetic-flux changing component 112 is removed (e.g. by removing the one or more fasteners 701) which enables the adjacent top cold plate 117 to be removed (e.g. which may be optional when the adjacent top cold plate 117 is optional and/or not present), and then the electrical winding 113 may be lifted off a core portion 109 (e.g. presuming a frame 798 of the connectors 123 is also unattached from the tray 124 and/or bracket by removing fasteners 799 thereto). The process may be reversed to place a new electrical winding 113 onto the electromagnetic actuator 100.

Hence, in general, at least one of the one or more cold plates 117 and the one or more magnetic-flux changing components 112 may be configured to retain and/or at least partially retain, at least one of the electrical windings 113. However, in other examples, one or more magnetic-flux changing components 112 may be configured to retain at least one of the electrical windings 113 without use of the cold plates 117 and/or one or more of the cold plates may be configured to retain at least one of the electrical windings 113 without use of the magnetic-flux changing components 112.

For example, dimensions of the magnetic-flux changing components 112 and/or the cold plates 117 may be selected such that one, but not the other, provides retaining force to the electrical windings 113 with, or without, respective retaining devices; for example, while not depicted, the electromagnetic actuator 100 may include straps, and/or any other suitable retaining device, which may be used to retain the cold plates 117 against the electrical windings 113, such that the straps, and the like, in combination with the cold plates 117, retain the electrical windings 113. Furthermore, such retaining devices may be used to retain the electrical windings 113 without the cold plates 117, which may be retained at the electromagnetic actuator 100 using other retaining devices (e.g. such as respective straps and the like).

However, as depicted, it is understood that the magnetic-flux changing components 112 are configured to both change magnetic flux density of the pole portions 109, as described above, and retain (e.g. and/or removably retain) the electrical windings 113. Furthermore, when the magnetic-flux changing components 112 include a non-ferromagnetic frame and/or respective non-ferromagnetic frames, such frames may be used to retain (e.g. and/or removably retain) the electrical windings 113 (e.g. as such frames may be against the cold plates 117, as shown in FIG. 7 and FIG. 8, with at least retaining devices of the magnetic-flux changing components 112, such as the one or more pins 704 (e.g. and holes in the pole-facing surface 705 of the magnetic-flux changing component 112 that mate with the holes 707), may be located at the frames rather than at the ferromagnetic portions and/or sections of the magnetic-flux changing components 112.

Similarly, it is understood that, as depicted the cold plates 117 are configured to both cool, and retain and (e.g. and/or removably retain) the electrical windings 113.

Heretofore the electrical windings 113 around the pole portions 109 have been depicted as planar. However, in other examples electrical windings may be used in an electromagnetic actuator which are not planar, and indeed are "kinked" and/or stepped, for example at an end-winding position, such that a larger volume between the pole portions 109 may be used for windings.

Figure 9A:
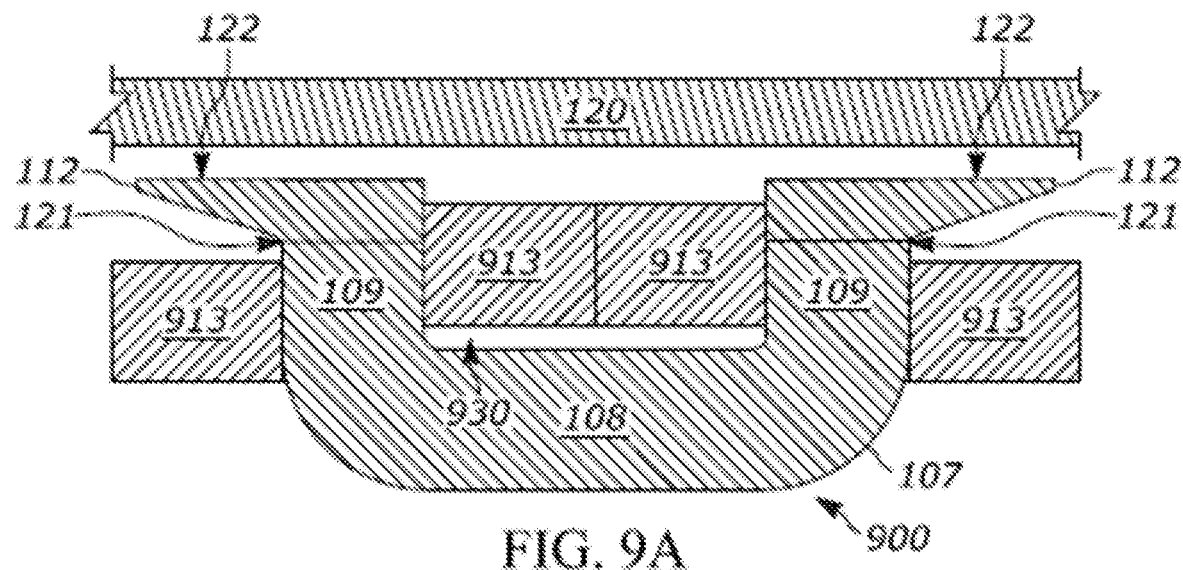
FIG. 9A and FIG. 9B depicts a schematic cross-section and a perspective view of an electromagnetic actuator, relative to a track, with kinked and/or stepped electrical windings, according to non-limiting examples.
Figure 9B:
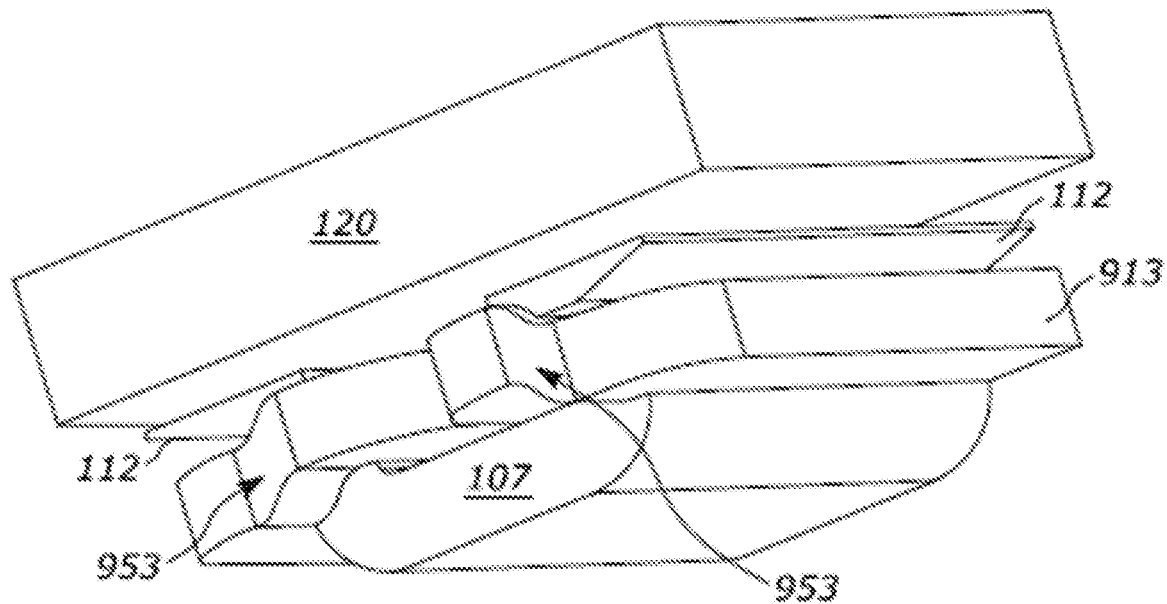

For example, attention is next directed to FIG. 9A and FIG. 9B which respectively depict: a schematic cross-section of an electromagnetic actuator 900 relative to the track 120, the electromagnetic actuator 900 with kinked and/or stepped electrical windings 913; and a perspective view of the electromagnetic actuator 900 relative to the track 120.

As depicted, the electromagnetic actuator 900 includes the ferromagnetic body 107 (e.g. including the back-iron portion 108 and the pole portions 109) and the magnetic-flux changing components 112, as described above. Furthermore, a slot 930 between the pole portions 109 is also depicted, as best seen in FIG. 9A. Indeed, as also best seen in FIG. 9A, the magnetic-flux changing components 112 extend out over the electrical windings 913 outside the slot 930 (e.g. to retain the electrical windings 913), which may restrict a position of the electrical windings 913 relative to the track-facing surfaces 122 of the magnetic-flux changing components 112. For example, an outer portion of the electrical windings 913 may be about aligned and/or "below" a pole face 121, but below a bottom surface of the slot 930; hence, if the electrical windings 913 were planar, a geometry of the electrical windings 913 would be restricted to being no higher and/or thicker than the relative positions of the pole faces 121 and a bottom surface of the slot 930. However, as the electrical windings 913 have kinks and/or steps 953 (e.g. as best seen in FIG. 9B) at end winding positions (e.g. position where the electrical windings 913 are around longitudinal ends of the pole portions 109), an inner portion of an electrical windings 913 in the slot 930 may be "above" the bottom of the slot 930, while an outer portion of an electrical windings 913 may be below the pole faces 121. Hence, a depth and/or thickness of the electrical windings 913 may be greater than planar electrical windings, which may lead to more "turns" in coils of the electrical windings 913; such a configuration may assist in generating magnetic flux at the electromagnetic actuator 900, as a similar current, as used for planar electrical windings, may lead to a greater magnetic flux in the electrical windings 913.

Put another way, the electrical windings 913 may include steps 953 and/or kinks and/or be formed along multiple planes (e.g. a first plane in the slot 930 and a second plane outside the slot 930), such that a portion of an electrical winding 913 in the slot 930 is at a different height than another portion of the winding outside of the slot 930, relative, for example, to the pole faces 121.

Put yet another way, shaping an electrical winding with a "kink"/step may ensure that magnetic-flux changing components 112 do not reduce the available winding area in a slot between pole portions of an electromagnetic actuator as described herein.

Other examples and/or embodiments are within the scope of the present specification. For example, electromagnetic actuators provided herein may include different arrangements of fittings, cold plates, connectors, trays and/or brackets, and the like, and/or magnetic flux sensors at any suitable locations, as well any suitable harnessing and/or connectors for the magnetic flux sensors.

Figure 10:
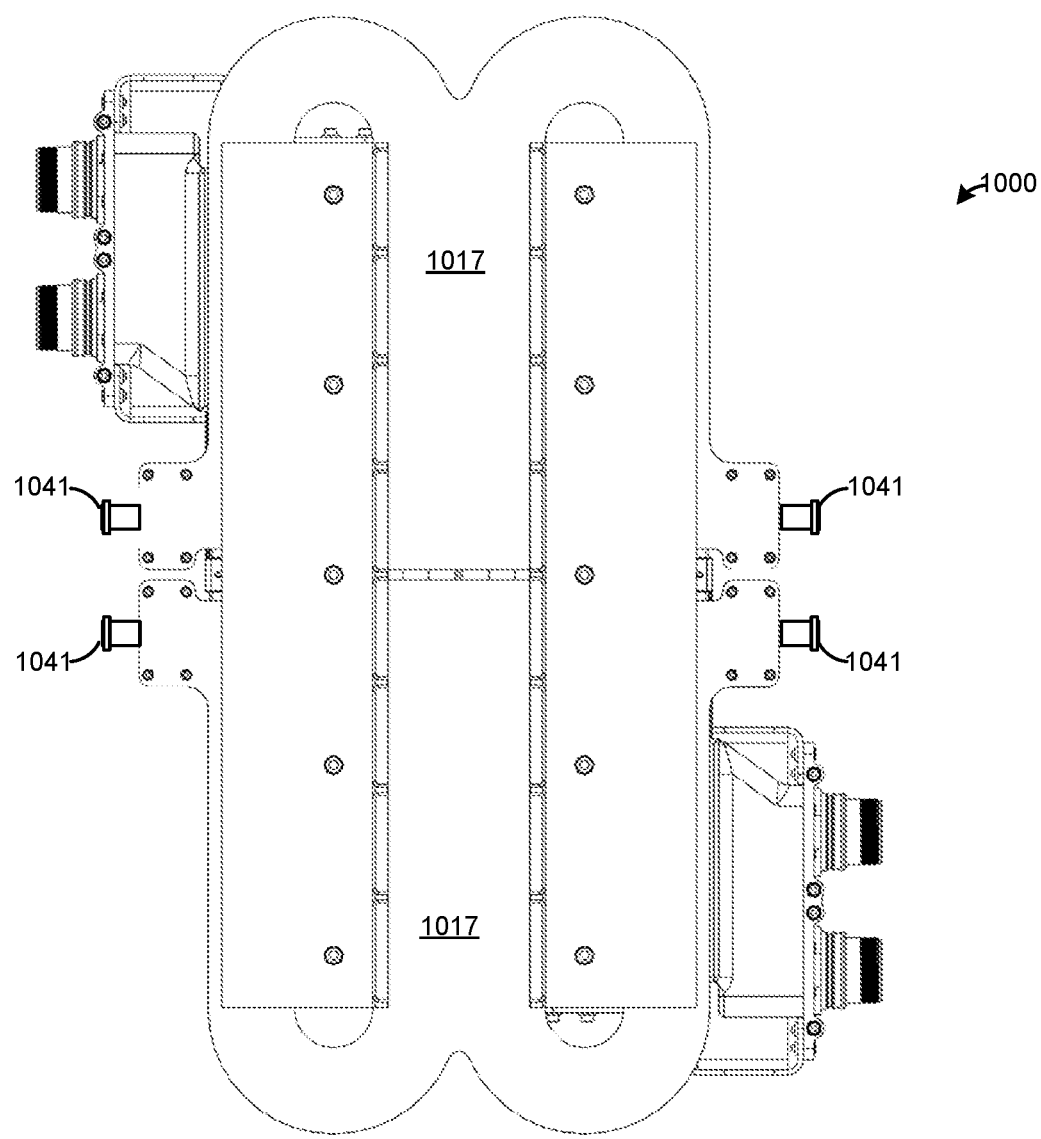
FIG. 10 depicts a top view of an alternative electromagnetic actuator for generating force that includes cold plate cooling channel connectors that are parallel to each other, according to non-limiting examples.

For example, attention is next directed to FIG. 10 which depicts a top view of an electromagnetic actuator 1000, which is substantially similar to the electromagnetic actuator 100, however, at least one cold plate 1017 (e.g. as depicted two cold plates 1017) of the electromagnetic actuator 1000 have been adapted such that adjacent respective connectors 1041 (e.g. cooling channel connectors) thereof extend in a same direction and/or are about parallel to each other, rather than being perpendicular to each other. For example, with reference to FIG. 4, adjacent connectors 141 of the cold plates 117 of the electromagnetic actuator 100 are perpendicular to each other.

In particular, the cold plates 1017 are adapted in such a manner may reduce a part count for the electromagnetic actuator 1000, as compared to the electromagnetic actuator 100, as the cold plates 1017 are generally the same and/or symmetrical (e.g. the cold plates 117 may be different from each other), though the cold plates 117, 1017 may otherwise be similar.

Furthermore, again comparing FIG. 10 and FIG. 4, the connectors 1041, 141 are understood to be of different types; however, it is further understood that the respective cold plates 1017, 117 may comprise tapped holes, and the like, at the depicted locations of the connectors 1041, 141, which may be used to attach any suitable connectors 1041, 141 thereto. Put another way, a connector 1041 may be used in place of a connector 141, and vice versa.

Figure 11:
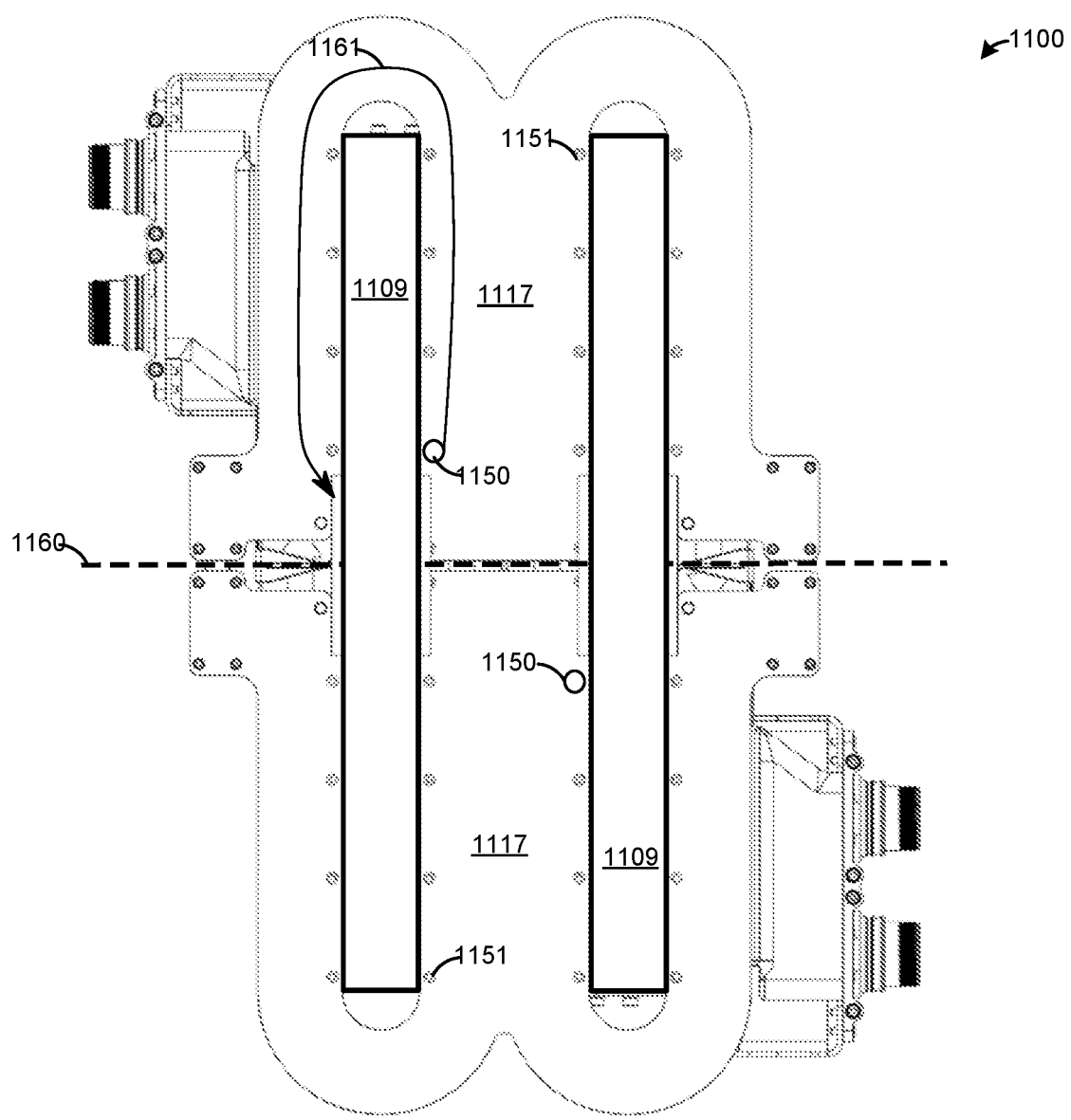
FIG. 11 depicts a top view of an alternative electromagnetic actuator for generating force that includes cold plates with single-point grounding and/or bonding to a back-iron portion, according to non-limiting examples.

Cold plates provided herein may be adapted in other ways. For example, attention is next directed to FIG. 11 which depicts a top view of an electromagnetic actuator 1100, which is substantially similar to one or more of the electromagnetic actuators 100, 1000. In FIG. 11, however, magnetic-flux changing components (e.g. similar to magnetic-flux changing components 112) are removed to show pole portions 1109 (e.g. similar to the pole portions 109) and details of at least one cold plate 1117 thereof (e.g. as depicted two cold plates 1117). While a back-iron portion (e.g. similar to the back-iron portion 108) is not depicted, it is understood that such a back-iron portion is present, for example under the cold plates 1117. In particular, as depicted, the cold plates 1117 are understood to be electrically connected and/or bonded to the back-iron portion at a respective single "point" and/or region (e.g. which may be referred to as single-point grounding/bonding).

For example, as depicted, the cold plates are electrically connected and/or bonded to the back-iron portion at respective single points 1150. While any suitable fasteners 1151, such as screws, bolts, and the like, may be used to physically attach the cold plates 1117 to the under-lying back-iron portion, it is understood that the fasteners 1151 do not electrically connect the cold plates 1117 to the under-lying back-iron portion. For example, the fasteners 1151 may comprise non-electrically conducting material and/or electrically insulating material, and/or the fasteners 1151 may be used in conjunction with non-electrically conducting and/or electrically insulating material washers, inserts, and the like. It is understood that any suitable combination of devices may be used to physically attach the cold plates 1117 to the under-lying back-iron portion, while also electrically isolating the cold plates 1117 from the under-lying back-iron portion other than at the respective single points 1150.

It is similarly understood that the cold plates 1117 are electrically isolated from perimeters of the pole portions 1109 (e.g. and any magnetic-flux changing components, similar to magnetic-flux changing components 112, which may be present) at respective edges thereof, via suitable gaps therebetween and/or an insulating material (not depicted) provided therebetween. However, it is understood that the cold plates 1117 may otherwise be electrically connected to the pole portions 1109 via the respective single points 1150 and the back-iron portion.

Such an arrangement generally enables the cold plates 1117 to be at a same and/or similar potential as the back-iron portion and the pole portions 1109 (e.g. to dissipate charge), while also reducing eddy currents in the cold plates 1117. For example, similar to the cold plates 117, the cold plates 1117 are interrupted by a gap (e.g. similar to the gap 401) to provide an electrical interruption between the cold plates 1117 to interrupt eddy currents in the cold plates 1117 around the pole portions 109. Such an electrical interruption in the cold plates 1117 is represented by a dashed line 1160.

Similarly, by electrically connecting the cold plates 1117 to an underlying back-iron portion at respective single points 1150 (e.g. and furthermore electrically isolating the cold plates 1117 from edges and/or perimeters of the pole portions 1109), eddy currents in the cold plates 1117, via the pole portions 1109, are interrupted. For example, as depicted, an arrow 1161 that extends from a single point 1150, around a pole portion 1109, and then ends without completing a circuit, represents an interrupted eddy current that is prevented from forming in the cold plate 1117.

In yet further examples, back-iron portions of electromagnetic actuators provided herein may be adapted to reduce eddy currents.

For example, attention is next directed to FIG. 12A, which depicts a bottom and/or underside view of the electromagnetic actuator 100 showing the back-iron portion 108. In particular, as depicted, the back-iron portion 108 is solid and/or formed from one piece of ferromagnetic material. As such eddy currents may form in such a configuration.

In contrast, attention is next directed to FIG. 12B, FIG. 12C and FIG. 12D which respectively depict bottom and/or underside views of electromagnetic actuators 1200-1, 1200-2, 1200-3 (interchangeably referred to, collectively, as the electromagnetic actuators 1200 and, generically, as an electromagnetic actuator 1200) showing respective back-iron portions 1208-1, 1208-2, 1208-3 (e.g. back-iron portions 1208 and/or a back-iron portion 1208).

The electromagnetic actuators 1200 may be substantially similar to any other of the electromagnetic actuators described herein, however, in contrast to the electromagnetic actuator 100, the back-iron portions 1208 are segmented (e.g. the back-iron portion 1208-2) and/or laminated and/or include gaps and/or partial gaps therein (e.g. from alternating edges in the back-iron portion 1208-1, and a same edge in the back-iron portion 1208-3) to interrupt eddy current formation. While FIG. 12B, FIG. 12C and FIG. 12D show specific examples of back-iron portions 1208, any back-iron portion of electromagnetic actuators provided herein may be adapted in any suitable manner to interrupt and/or reduce eddy currents; such adaptation may further include oxide coatings between segments and/or laminations and/or gaps, and the like, though such segments and/or laminations and/or gaps, and the like, may be adapted to include single point bonding, and the like, so they are at a same electrical potential. While not depicted, pole portions provided herein may be similarly adapted.

In yet further examples, electromagnetic actuators provided herein may be adapted to include magnetic flux sensors.

For example, attention is next directed to FIG. 13A and FIG. 13 B which depict top views of electromagnetic actuators 1300-1, 1300-2 (interchangeably referred to, collectively, as the electromagnetic actuators 1300 and, generically, as an electromagnetic actuator 1300), and show respective magnetic-flux changing components 1312-1, 1312-2 (e.g. magnetic-flux changing components 1312 and/or a magnetic-flux changing component 1312, similar to the magnetic-flux changing components 112) and respective connectors 1323-1, 1323-2 (e.g. connectors 1323 and/or a connector 1323, similar to the connectors 123). Furthermore, the electromagnetic actuator 1300-1 is depicted with a computing device 1390-1 which control power to the connectors 1323-1 via power sources 1399-1; similarly, the electromagnetic actuator 1300-2 is depicted with a computing device 1390-2 which control power to the connectors 1323-2 via power sources 1399-2. The computing devices 1390-1, 1390-2 are interchangeably referred to hereafter as computing devices 1390 and/or a computing device 1390, and the power sources 1399-1, 1399-2 are interchangeably referred to hereafter as power sources 1399 and/or a power source 1399.

The electromagnetic actuators 1300 may be substantially similar to any other of the electromagnetic actuators described herein, however, the respective magnetic-flux changing components 1312 of the electromagnetic actuators 1300 are adapted to include magnetic flux sensors 1360, for example at opposite ends thereof (e.g. the magnetic-flux changing component 1312-1) and/or at about a middle thereof (e.g. the magnetic-flux changing component 1312-2). The respective magnetic-flux changing components 1312 are understood to include grooves and/or apertures and/or recesses, and the like, at which the magnetic flux sensors 1360 are received.

While examples of specific locations of the magnetic flux sensors 1360 are shown it is understood that the magnetic flux sensors 1360 are positioned at any suitable location and an electromagnetic actuator may include any suitable number of magnetic flux sensors 1360. Regardless, a magnetic flux sensor 1360 is understood to measure magnetic flux flowing about perpendicular to a respective magnetic-flux changing component 1312.

As such, magnetic flux in the electromagnetic actuators 1300 may be monitored, for example by external computing device 1390-1, 1390-2 (e.g. at a vehicle to which an electromagnetic actuator 1300 is attached) which receives signals from the magnetic flux sensors 1360 that represent measured magnetic flux. Power to respective electrical windings of the electromagnetic actuators 1300 (e.g. via respective connectors 1323) may be controlled by the computing device 1390 in a feedback loop with signals from the magnetic flux sensors 1360 to control magnetic flux in the electromagnetic actuators 1300 to given values. Hence, the magnetic flux sensors 1360 are understood to be adapted for communicative coupling to such a computing device 1390, for example via any suitable harnessing and/or wiring and/or data connectors of the electromagnetic actuators 1300 and/or via wireless communication links (e.g. in such examples, the magnetic flux sensors 1360 may include respective transceivers for wireless communication).

Hence, as depicted the magnetic flux sensors 1360 are understood to be communicatively coupled with a computing device 1390 (e.g. wirelessly and/or via a data connector); such a computing device 1390 is generally configured to control power to respective electrical windings of an electromagnetic actuator 1300 (e.g. via respective connectors 1323) via the power sources 1399 connected to the connectors 1323. Furthermore, while the magnetic flux sensors 1360 are depicted as being both deployed on an electromagnetic actuator 1300, and as being separately communicatively coupled to a computing device 1390, it is understood that an electromagnetic actuator 1300 (and a vehicle thereof) comprises wiring and/or harnessing and/or communication links connecting the magnetic flux sensors 1360 to a computing device 1390. Regardless, a computing device 1390 is understood to be configured to: control power to electrical windings of an electromagnetic actuator 1300 based on magnetic flux measured by the magnetic flux sensors 1360.

Put another way, an electromagnetic actuator provided herein may comprise one or more magnetic flux sensors configured to measure magnetic flux of one or more magnetic-flux changing components, and electrical windings of the electromagnetic actuator may be controllable by a computing device communicatively coupled to the one or more magnetic flux sensors, the computing device configured to control the magnetic flux in a feedback loop with the one or more magnetic flux sensors.

For example, attention is next directed to FIGS. 14A and 14B which respectively depict a bottom (e.g. underside) view, and side view of an electromagnetic actuator 1400, which is substantially similar to the electromagnetic actuators 1300, and include magnetic-flux changing components 1412, connectors 1423, etc. (e.g. respectively similar to the flux changing components 1312-1, and connectors 1323). However, the electromagnetic actuator 1400 includes one or more magnetic flux sensors 1460 (though only one is depicted) incorporated into ends of one or more of the magnetic-flux changing components 1412, a data connector 1470, adjacent one pair of the connectors 1423, and wiring and/or harnessing 1475 between the data connector 1470 and the one or more magnetic flux sensors 1460. The harnessing 1475 may be interchangeably referred to herein as sensor harnessing and/or a sensor harness.

While as depicted the harnessing 1475 is to only one magnetic flux sensor 1460, the harnessing 1475 is understood to be between any of one or more magnetic flux sensors 1460 present at the electromagnetic actuator 1400 and the data connector 1470.

Furthermore, while the harnessing 1475 is depicted as being between the magnetic flux sensor 1460 and the data connector 1470 and located along a side of the electromagnetic actuator 1400 and along a ledge 1439 (e.g. of a ferromagnetic body) of the electromagnetic actuator 1400 (e.g. similar to the ledge 139), the harnessing 1475 may be in any suitable position and/or path at the electromagnetic actuator 1400.

In particular, while not depicted, it is understood that the harnessing 1475 may be in any suitable position and/or path at the electromagnetic actuator 1400 and may be attached to any suitable portion of the electromagnetic actuator via any suitable combination of fasteners, clips, brackets, loops, belts and the like. Hence, in general, the harnessing 1475 is understood to be self-contained at electromagnetic actuator 1600 (e.g. and is not attached to external structures such as a vehicle, and the like, to which the electromagnetic actuator 1400 may be attached. Put another way, the harnessing 1475 may be retained at the electromagnetic actuator 1400 itself using any suitable combination internal attachment devices, and without any external "scaffolding" and/or external attachment devices, and the like, for example at a vehicle, and the like, to which the electromagnetic actuator 1400 may be attached (e.g. such external scaffolding and/or external attachment devices may be understood as attachment devices external to the electromagnetic actuator 1400).

Similarly, the data connector 1470 may be in any suitable position and is understood to generally connect to a complementary data connector that connects the one or more magnetic flux sensors 1460 to a computing device (e.g. at a vehicle to which the electromagnetic actuator 1400 is attached), for example to control power to the electromagnetic actuator 1400 in a feedback loop with measured magnetic flux.

While one type of electrical connector (e.g. the connectors 123, 1323, 1423) has heretofore been depicted herein, electromagnetic actuators provided herein may be adapted to include other types of connectors. Similarly, while one type of tray 124 and/or bracket has heretofore been depicted herein, electromagnetic actuators provided herein may be adapted to include other types of trays and/or brackets.

For example, attention is next directed to FIG. 15A and FIG. 15B which respectively depict details of the connectors 123 and the tray 124 and/or bracket of the electromagnetic actuator 100, and details of respective connectors 1523 and a tray 1524 and/or bracket of an electromagnetic actuator 1500. While the remainder of the electromagnetic actuator 1500 is not depicted, the electromagnetic actuator 1500 is understood to be otherwise similar to any of the electromagnetic actuators provided herein.

Comparing FIG. 15A and FIG. 15B it is apparent that the connectors 1523 have a different configuration than the connectors 123; similarly, the tray 1524 and/or has a different physical footprint than the tray 124 and/or bracket of the electromagnetic actuator 100, and details of respective connectors 1523. Such a comparison merely illustrates that different any suitable configuration of electrical connectors and/or trays and/or brackets is within the scope of the present specification. For example, the tray 1524 may be combined with the connectors 123 and/or the tray 124 may be combined with the connectors 1523.

A tray and/or bracket of electromagnetic actuators provided herein may be adapted to provide more support for connectors.

For example, attention is next directed to FIG. 16A and FIG. 16B which depict respective side views of the electromagnetic actuator 100, and an electromagnetic actuator 1600. FIG. 16A is similar to FIG. 3 and shows the tray 124 bolted and/or fastened to the back-iron portion 108 to support the connectors 123. The electromagnetic actuator 1600 is substantially similar to the electromagnetic actuator 100, and includes connectors 1623 similar to connectors 123 and a back-iron portion 1608. The back-iron portion 1608 is similar to back-iron portion 108, but, as depicted has a rectangular profile in the depicted side view; such an example illustrates that back-iron portions provided herein may be any suitable shape, for example to shape flow of magnetic flux and/or to facilitate attachment of other components (i.e. of electromagnetic actuators provided herein) thereto. In further contrast to the electromagnetic actuator 100, a tray 1624 and/or bracket of the electromagnetic actuator 1600 is connected and/or attached to the back-iron portion 1608 via an adapter device 1610. The adapter device 1610 may facilitate adjustment of the position of the tray 1624, and hence the connectors 1623, relative to remaining portions of the electromagnetic actuator 1600.

For example, the adapter device 1610 may comprise an adjustable shim and/or an adapter plate and/or an adjustable adapter plate between the back-iron portion 1608 and the tray 1624. The adapter device 1610 may be used to adjust the location of the tray 1624, relative to the back-iron portion 1608 prior to the tray 1624 being bolted and/or fastened to the back-iron portion 1608. Such an adjustment hence adjusts a location of the connectors 1623 relative to the back-iron portion 1608 and/or other components of the electromagnetic actuator 1600, for example to better position the connectors 1623 for connection to complementary external connectors (e.g. located at a vehicle, and the like, to which the electromagnetic actuator 1600 is attached). While bolts and/or fasteners, bolting and/or fastening the tray 1624 being to the back-iron portion 1608, are not shown in FIG. 16B, they are nonetheless understood to be present.

While the back-iron portion 1608 of the electromagnetic actuator 1600 is depicted as rectangular in FIG. 16B, the back-iron portion 1608 is understood to be functionally similar to the back-iron portion 108; however, such a back-iron portion 1608 of the electromagnetic actuator 1600 may be adapted to include different radiuses and/or corners at various regions, for example to better facilitate attachment of the tray 1624 (and/or other components) thereto.

While various electromagnetic actuators have been described herein with respect to various features, it is understood that any such features described herein may be combined in any suitable manner at an electromagnetic actuator.

For example, alternative electromagnetic actuators may be provided without the one or more magnetic-flux changing components 112 with remaining components adapted accordingly to retain and/or cool electrical windings (e.g. certain functionality of the magnetic-flux changing components may be integrated into other parts of an alternative electromagnetic actuator provided herein). In such examples, such alternative electromagnetic actuators may include any suitable number or retaining devices, such as straps, and the like, for retaining and/or removably retaining electrical windings. Furthermore, in such examples, such alternative electromagnetic actuators may include any suitable number or cooling devices, such as cold plates, and the like, for cooling the electrical windings which may also be used to retain the electrical windings. Any of the various alternatives described herein may be incorporated into such electromagnetic actuators.

In this specification, components may be described as "configured to" perform one or more functions or "configured for" such functions. In general, a component that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of computing devices (e.g. computing devices 1390) and/or methods and/or processes described herein can be implemented using pre-programmed hardware or firmware elements (e.g., an application specific integrated circuit (ASIC), a Field Programmable Gate Array (FPGA), a programmable array logic (PAL), a programmable logic array (PLA), a programmable logic device (PLD), electrically erasable programmable read-only memories (EEPROMs), etc.), or other related components. In other examples, the functionality of the computing devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM (Compact Disc-Read-Only Memory), ROM (Read-Only Memory), fixed disk, USB (Universal Serial Port) drive, optical drive, and the like). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof. Furthermore, such computing devices (e.g. computing devices 1390) and/or methods and/or processes described herein may be implemented using "engines" which may be understood to include hardware (e.g. implemented as an ASIC, an FPGA, a PAL, a PLA, a PLD etc.), and/or a combination of hardware and software (e.g. a combination of hardware and software includes software hosted at hardware, such as a software module that is stored at a processor-readable memory implemented or interpreted by a processor), or hardware and software hosted at hardware.

Persons skilled in the art will appreciate that there are yet more alternative examples and modifications possible, and that the above examples are only illustrations of one or more examples. The scope, therefore, is only to be limited by the claims appended hereto.

What is claimed is:

1. An electromagnetic actuator for generating force comprising:
    a ferromagnetic body extending along a longitudinal axis, the ferromagnetic body comprising: a back-iron portion; and a pair of pole portions, extending from the back-iron portion, the back-iron portion connecting the pair of pole portions;
    one or more magnetic-flux changing components removably attached to one or more pole faces of the pole portions, a respective magnetic-flux changing component located at a respective pole face, the respective magnetic-flux changing component configured to change magnetic flux density at a respective track-facing surface relative to the respective pole face; and, electrical windings around the pole portions.

2. The electromagnetic actuator of claim 1, wherein the one or more magnetic-flux changing components are one or more of tapered and flanged in a direction of a lateral axis, perpendicular to the longitudinal axis, the lateral axis extending between opposing outer sides of the pair of pole portions, and track-facing surfaces of the one or more magnetic-flux changing components are one or more of flat and parallel to both the longitudinal axis and the lateral axis.

3. The electromagnetic actuator of claim 1, further comprising a lateral axis, perpendicular to the longitudinal axis, the lateral axis extending between opposing outer sides of the pair of pole portions, wherein each of the one or more magnetic-flux changing components comprises a respective bar located at the respective pole face, the respective bar extending along the longitudinal axis at the respective pole face, the respective bar decreasing in width along the lateral axis, towards a respective outer side.

4. The electromagnetic actuator of claim 3, wherein respective outward facing surfaces of respective bars are flat and about parallel with each other.

5. The electromagnetic actuator of claim 1, wherein the one or more magnetic-flux changing components are in a one-to-one relationship with the pole portions.

6. The electromagnetic actuator of claim 1, wherein the electrical windings are removable, and the respective magnetic-flux changing component is further configured to at least partially retain at least one of the electrical windings.

7. The electromagnetic actuator of claim 1, further comprising one or more cold plates single point bonded to the back-iron portion.

8. The electromagnetic actuator of claim 1, further comprising one or more cold plates and cooling channel connectors to the one or more cold plates, the cooling channel connectors being about parallel to each other.

9. The electromagnetic actuator of claim 1, further comprising one or more cold plates configured to at least partially retain at least one of the electrical windings, the one or more cold plates and the electrical windings being removable.

10. The electromagnetic actuator of claim 1, further comprising one or more cold plates between the electrical windings and the one or more magnetic-flux changing components, wherein at least one of the one or more cold plates and the one or more magnetic-flux changing components are configured at least partially retain at least one of the electrical windings.

11. The electromagnetic actuator of claim 1, further comprising connectors to the electrical windings.

12. The electromagnetic actuator of claim 1, further comprising connectors to the electrical windings and a tray configured to support the electrical windings.

13. The electromagnetic actuator of claim 1, wherein the back-iron portion is adapted to one or more of reduce and interrupt eddy currents.

14. The electromagnetic actuator of claim 1, further comprising: one or more magnetic flux sensors at the one or more magnetic-flux changing components; a data connector configured to connect to an external computing device; and harnessing between the one or more magnetic flux sensors and the data connector.

15. The electromagnetic actuator of claim 14, wherein the harnessing is self-contained at the electromagnetic actuator without attachment to external scaffolding.

16. The electromagnetic actuator of claim 1, further comprising a slot between the pole portions, wherein the electrical windings include one or more of steps and kinks such that a portion of an electrical winding in the slot is at a different height than another portion of the electrical winding outside of the slot, relative to respective pole faces of the pole portions.

17. The electromagnetic actuator of claim 1, further comprising one or more magnetic flux sensors configured to measure magnetic flux of the one or more magnetic-flux changing components, wherein the electrical windings are controllable by a computing device communicatively coupled to the one or more magnetic flux sensors, and the computing device is configured to control the magnetic flux in a feedback loop with the one or more magnetic flux sensors.

* * * * *